United States Patent
Kodera et al.

(10) Patent No.: US 11,897,550 B2
(45) Date of Patent: Feb. 13, 2024

(54) STEERING CONTROL DEVICE

(71) Applicants: JTEKT CORPORATION, Osaka (JP); TOYOTA JIDOSHA KABUSHIKI KAISHA, Toyota (JP)

(72) Inventors: Takashi Kodera, Okazaki (JP); Toru Takashima, Susono (JP); Shunsuke Yoshida, Nisshin (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 17/211,501

(22) Filed: Mar. 24, 2021

(65) Prior Publication Data
US 2021/0300464 A1    Sep. 30, 2021

(30) Foreign Application Priority Data

Mar. 27, 2020  (JP) ................. 2020-057676

(51) Int. Cl.
*B62D 5/00* (2006.01)
*B62D 5/04* (2006.01)
*B62D 6/00* (2006.01)

(52) U.S. Cl.
CPC .......... *B62D 5/003* (2013.01); *B62D 5/0481* (2013.01); *B62D 5/0487* (2013.01); *B62D 5/0496* (2013.01); *B62D 5/046* (2013.01); *B62D 6/002* (2013.01); *B62D 6/008* (2013.01)

(58) Field of Classification Search
None
See application file for complete search history.

(56) References Cited

U.S. PATENT DOCUMENTS

| | | | |
|---|---|---|---|
| 2012/0136506 A1* | 5/2012 | Takeuchi | B60G 17/016 701/1 |
| 2015/0344066 A1* | 12/2015 | Tsubaki | B62D 6/08 701/41 |
| 2016/0200355 A1* | 7/2016 | Mori | H02P 21/22 180/446 |

(Continued)

FOREIGN PATENT DOCUMENTS

| | | | | |
|---|---|---|---|---|
| EP | 3279060 A1 * | 2/2018 | | B62D 5/003 |
| EP | 3 437 960 A1 | 2/2019 | | |

(Continued)

OTHER PUBLICATIONS

Sep. 9, 2021 extended Search Report issued in European Patent Application No. 21165247.4.

(Continued)

*Primary Examiner* — Amelia Vorce
(74) *Attorney, Agent, or Firm* — Oliff PLC

(57) ABSTRACT

A steering control device configured to control a steering device includes a control unit. The control unit is configured to calculate a torque command value which is a target value of the motor torque based on execution of angle control for adjusting a convertible angle which is able to be converted to a rotation angle of the motor to a target angle; calculate the motor control signal based on the torque command value; and change a control gain which is used for the angle control based on a change of a factor influencing a behavior of a vehicle in response to steering.

8 Claims, 7 Drawing Sheets

(56) References Cited

U.S. PATENT DOCUMENTS

| | | | |
|---|---|---|---|
| 2017/0106898 A1* | 4/2017 | Sakaguchi | B62D 15/0215 |
| 2017/0166245 A1* | 6/2017 | Kim | B62D 5/049 |
| 2017/0247048 A1* | 8/2017 | Namikawa | B62D 6/006 |
| 2018/0086369 A1 | 3/2018 | Yanagi | |
| 2018/0118254 A1* | 5/2018 | Toko | B62D 5/0496 |
| 2018/0201298 A1* | 7/2018 | Yamano | B62D 5/006 |
| 2018/0273026 A1* | 9/2018 | Oyama | B60W 30/18145 |
| 2018/0304919 A1* | 10/2018 | Jung | B62D 6/00 |
| 2018/0339725 A1 | 11/2018 | Kodera et al. | |
| 2019/0193782 A1* | 6/2019 | Tsubaki | B62D 6/007 |
| 2020/0023893 A1* | 1/2020 | Naik | B62D 5/0466 |
| 2020/0062294 A1 | 2/2020 | Kodera et al. | |
| 2020/0231204 A1* | 7/2020 | Isshiki | B62D 5/0463 |
| 2020/0231206 A1* | 7/2020 | Tsubaki | B62D 5/046 |
| 2020/0391790 A1* | 12/2020 | Kamemura | B62D 5/006 |
| 2020/0406963 A1* | 12/2020 | Nakada | H02P 27/06 |
| 2021/0039504 A1* | 2/2021 | Umetsu | B60W 20/15 |
| 2021/0245800 A1* | 8/2021 | Kitazume | B62D 5/0463 |

FOREIGN PATENT DOCUMENTS

| | | | | | |
|---|---|---|---|---|---|
| JP | 2003-002223 A | | 1/2003 | | |
| JP | 2007-137283 A | | 6/2007 | | |
| JP | 2016001953 A | * | 1/2016 | | H02P 29/00 |
| JP | 2018-199477 A | | 12/2018 | | |
| JP | 2019093903 A | * | 6/2019 | | B62D 5/0403 |
| PA | 2018-047875 A | | 3/2018 | | |
| WO | WO-2012032395 A1 | * | 3/2012 | | B62D 15/025 |

OTHER PUBLICATIONS

Jul. 25, 2023 Office Action issued in Japanese Patent Application No. 2020-057676.

Partial Translation dated Jul. 25, 2023 Office Action issued in Japanese Patent Application No. 2020-057676.

\* cited by examiner

STEERING CONTROL DEVICE

CROSS-REFERENCE TO RELATED APPLICATION

This application claims priority to Japanese Patent Application No. 2020-057676 filed on Mar. 27, 2020, incorporated herein by reference in its entirety.

BACKGROUND

1. Technical Field

The disclosure relates to a steering control device.

2. Description of Related Art

In the related art, an electric power steering system (EPS) that applies an assist force for assisting with a driver's steering using a motor is known as a steering device for a vehicle. A steer-by-wire (SBW) steering device (in other words, a steer-by-wire steering system) in which transmission of power between a steering unit which is steered by a driver and a turning unit that turns turning wheels in accordance with a driver's steering is cut off is also known as a steering device for a vehicle. A steering control device that controls such a steering device, operation of a motor is controlled by performing angle feedback control for causing a turning angle of the turning wheels to conform to a target turning angle such that improvement in steering feeling, or improvement in turning characteristics of the turning wheels, or the like is achieved.

Recently, redundancy of a configuration for applying a motor torque to a steering device has progressed. For example, Japanese Unexamined Patent Application Publication No. 2018-47875 (JP 2018-47875 A) discloses a configuration in which a motor including two coil groups with different power supply paths is employed as a motor that applies a motor torque to a steering device. In a steering control device disclosed in the publication includes groups of a microcomputer and a drive circuit corresponding to the two coil groups. The microcomputers individually control supply of electric power to the two coil groups by controlling the corresponding drive circuits. That is, two control systems that individually control torques which are generated in the two coil groups are constructed between the motor and the steering control device. Accordingly, for example, even when an abnormality occurs in one of the two control systems, a motor torque can be continuously applied from the motor to the steering device by supplying electric power to the corresponding coil group via the other control system.

SUMMARY

In the configuration described in JP 2018-47875 A, a drive mode of the motor varies, for example, when an abnormality occurs in one of the two control systems and when the two control systems are normal. Accordingly, even when a current command value for the motor is the same, a rotation angle of the motor is not the same. That is, plant characteristics (that is, a transfer function) of a system with the current command value for the motor serving as an input and with the rotation angle of the motor serving as an output vary depending on the drive mode of the motor. When the plant characteristics vary in this way, for example, conformity of the turning angle with the target turning angle varies and thus the behavior of a vehicle in response to steering may be influenced.

A factor influencing the behavior of the vehicle in response to steering is not limited to the drive mode of the motor, but includes, for example, a change in load state which is applied to the steering device such as whether a brake operation is performed.

The disclosure provides a steering control device that can achieve optimization of the behavior of a vehicle in response to steering.

An aspect of the disclosure relates to a steering control device configured to control a steering device to which a motor torque is applied from an actuator with a motor as a drive source. The steering control device includes a control unit configured to output a motor control signal for controlling operation of the motor; a drive circuit configured to supply a drive electric power to the motor based on the motor control signal. The control unit is configured to calculate a torque command value which is a target value of the motor torque based on execution of angle control for adjusting a convertible angle which is able to be converted to a rotation angle of the motor to a target angle; calculate the motor control signal based on the torque command value; and change a control gain which is used for the angle control based on a change of a factor influencing a behavior of a vehicle in response to steering.

With this configuration, since the control gain which is used for the angle control is changed based on a change of the factor influencing the behavior of the vehicle in response to steering, it is possible to optimize the angle control according to the factor and to achieve optimization of the behavior of the vehicle in response to steering.

In the steering control device, the motor may include a plurality of coil groups with different power supply paths; a plurality of groups each including the control unit and the drive circuit may be provided such that the groups respectively correspond to the coil groups, the number of the groups being same as the number of the coil groups; a plurality of control systems may be provided between the motor and the steering control device, the control systems being configured to individually control torques generated by the coil groups; and the factor may include a drive mode of the motor.

With this configuration, since the control gain is changed according to the drive mode, it is possible to optimize the angle control and to achieve optimization of the behavior of the vehicle in response to steering even when a degree of adjustment of the convertible angle to the target angle due to execution of the angle control is changed by changing the drive mode.

In the steering control device, the drive mode may include a cooperative mode in which the torques generated by the coil groups of the control systems are controlled based on the torque command value calculated by the control unit of one of the control systems, an independent mode in which the torque generated by each of the coil groups of the control systems is controlled based on the torque command value calculated by the control unit of a corresponding one of the control systems, and a residual mode in which, when one of the control systems is abnormal, the torque generated by the coil group of a remainder of the control systems is controlled based on the torque command value calculated by the control unit of the remainder of the control systems, the remainder being normal; and the control gain may change such that the control gain increases in order of the independent mode, the cooperative mode, and the residual mode.

With this configuration, a great motor torque becomes less likely to be generated (i.e., the likelihood of generation of a great motor torque decreases) in the order of the independent mode, the cooperative mode, and the residual mode. Accordingly, by increasing the control gain in this order, it is possible to perform optimal angle control according to the drive mode of the motor.

In the steering control device, the factor may include a vehicle speed, and the control gain may change such that the control gain increases with an increase of the vehicle speed. As the vehicle speed increases, the torque required for turning the turning wheels increases. Accordingly, the degree of adjustment of the convertible angle to the target angle due to execution of the angle control changes with the change of the vehicle speed and the behavior of the vehicle in response to steering is influenced. In this regard, with this configuration, since the control gain increases with the increase of the vehicle speed, it is possible to perform optimal angle control according to the vehicle speed.

In the steering control device, the factor may include an acceleration-deceleration state of the vehicle, and the control gain may change to be smaller when the vehicle is in a deceleration state than when the vehicle is in a non-deceleration state.

When the vehicle is in the deceleration state, the center of gravity of the vehicle moves forward, and thus a stability factor which is a value based on a difference between a load acting on front wheels and a load acting on rear wheels is likely to have a negative value and the vehicle is likely to over-steer. In this regard, with this configuration, since the control gain decreases when the vehicle is in the deceleration state, it is possible to curb oversteering and to achieve improvement in a steering feeling.

In the steering control device, the factor may include a lateral acceleration, and the control gain may change such that the control gain increases with an increase of an absolute value of the lateral acceleration. As the lateral acceleration increases, the torque required for turning the turning wheels increases. Accordingly, the degree of adjustment of the convertible angle to the target angle due to execution of the angle control changes with the change of the lateral acceleration and the behavior of the vehicle in response to steering is influenced. In this regard, with this configuration, since the control gain increases with the increase of the absolute value of the lateral acceleration, it is possible to perform optimal angle control according to the lateral acceleration.

In the steering control device, the factor may include at least one target temperature among a temperature of the motor, a temperature of the control unit, a temperature of the drive circuit, a temperature of the steering device, and an ambient temperature around the steering device, and the control gain may change such that the control gain increases with a decrease of the target temperature.

As the temperature of the motor decreases, for example, the viscosity of grease therein increases and thus it is necessary to generate a greater torque to rotate the motor. This is not limited to the temperature of the motor, and the same applies to other temperatures. Accordingly, the degree of adjustment of the convertible angle to the target angle due to execution of the angle control changes with the change of the target temperature and the behavior of the vehicle in response to steering is influenced. In this regard, with this configuration, since the control gain increases with the decrease of the target temperature, it is possible to perform optimal angle control according to the target temperature.

In the steering control device, the angle control may include feedback control for causing the convertible angle to conform to the target angle, and the control gain may include a feedback gain which is used for the feedback control.

In the steering control device, the angle control may include feedforward control based on the target angle, and the control gain may include a feedforward gain which is used for the feedforward control.

In the steering control device, the angle control may include damping control based on a target angular velocity which is a rate of change of the target angle, and the control gain may include a damping gain which is used for the damping control.

With these configurations, it is possible to appropriately adjust the convertible angle to a target angle.

According to the aspect of the disclosure, it is possible to achieve optimization of the behavior of a vehicle in response to steering.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
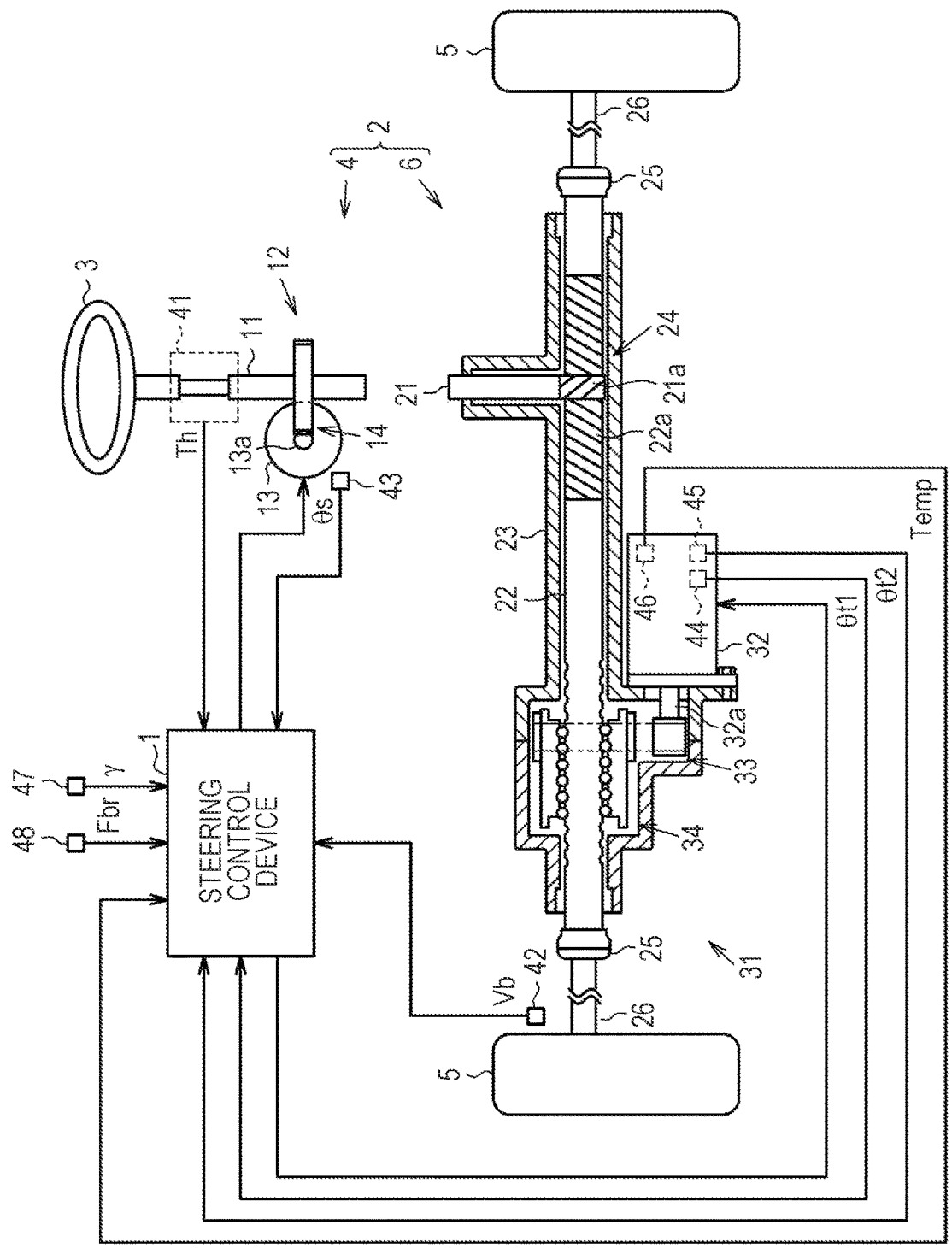
FIG. 1 is a diagram schematically illustrating a configuration of a steering device.

Hereinafter, a steering control device according to an embodiment will be described with reference to the accompanying drawings. As illustrated in FIG. 1, a steering device 2 which is controlled by the steering control device 1 according to this embodiment is configured as a steer-by-wire steering device (in other words, a steer-by-wire steering system). The steering device 2 includes a steering unit 4 that is steered by a driver using a steering wheel 3 and a turning unit 6 that turns turning wheels 5 in accordance with the driver's steering of the steering unit 4.

The steering unit 4 includes a steering shaft 11 to which a steering wheel 3 is fixed and a steering-side actuator 12 that applies a steering reaction force to the steering wheel 3 via the steering shaft 11. The steering reaction force is a force against a driver's steering. The steering-side actuator 12 includes a steering-side motor 13 that serves as a drive source and a steering-side reduction gear 14 that reduces rotation (i.e., reduces the speed of rotation) of the steering-side motor 13 and transmits the reduced rotation to the steering shaft 11. That is, the steering-side motor 13 applies a motor torque thereof as the steering reaction force. For example, a three-phase surface permanent magnet synchronous motor (SPMSM) is employed as the steering-side motor 13 in this embodiment.

The turning unit 6 includes a pinion shaft 21, a rack shaft 22 serving as a turning shaft that is connected to the pinion shaft 21, a rack housing 23 that accommodates the rack shaft 22 such that it can reciprocate, and a rack and pinion mechanism 24 that includes the pinion shaft 21 and the rack shaft 22. The pinion shaft 21 and the rack shaft 22 are arranged to have a predetermined crossing angle. Pinion teeth 21a formed in the pinion shaft 21 and rack teeth 22a formed in the rack shaft 22 engage with each other to constitute the rack and pinion mechanism 24. That is, the pinion shaft 21 corresponds to a rotation shaft whose rotation angle can be converted to a turning angle of the turning wheels 5. Tie rods 26 are respectively connected to both ends of the rack shaft 22 via rack ends 25 each of which is formed of a ball joint. The tips of the tie rods 26 are connected to knuckles (not illustrated) to which the right and left turning wheels 5 are assembled.

The turning unit 6 includes a turning-side actuator 31 that applies a turning force for turning the turning wheels 5 to the rack shaft 22. The turning-side actuator 31 includes a turning-side motor 32 that serves as a drive source, a transmission mechanism 33, and a conversion mechanism 34. The turning-side actuator 31 applies a turning force to the turning unit 6 by transmitting rotation of the turning-side motor 32 to the conversion mechanism 34 via the transmission mechanism 33 and causing the conversion mechanism 34 to convert the rotation to reciprocating movement of the rack shaft 22. That is, the turning-side motor 32 applies a motor torque thereof as the turning force. In this embodiment, for example, a surface permanent magnet synchronous motor is employed as the turning-side motor 32, for example, a belt mechanism is employed as the transmission mechanism 33, and, for example, a ball screw mechanism is employed as the conversion mechanism 34.

In the steering device 2 having the aforementioned configuration, a turning angle of the turning wheels 5 is changed by applying the turning force from the turning-side actuator 31 to the rack shaft 22 according to a driver's steering operation. At this time, a steering reaction force is applied to the steering wheel 3 from the steering-side actuator 12.

An electrical configuration according to this embodiment will be described below. The steering control device 1 is connected to the steering-side motor 13 and the turning-side motor 32 and controls operation thereof. The steering control device 1 includes a central processing unit (CPU) and a memory which are not illustrated. Various types of control are performed by causing the CPU to execute a program stored in the memory in each of predetermined operation cycles.

The steering control device 1 controls the steering-side motor 13 and the turning-side motor 32 with reference to state quantities which are detected by various sensors. The state quantities include a steering torque Th which is detected by a torque sensor 41, and a vehicle speed Vb which is detected by a vehicle speed sensor 42. The torque sensor 41 is provided on the steering wheel 3 side of a part of the steering shaft 11 which is connected to a steering-side reduction gear 14. The steering torque Th is a torque which is input by a driver using the steering wheel 3.

The state quantities include a rotation angle θs of an output shaft 13a of the steering-side motor 13 which is detected by a steering-side rotation angle sensor 43, a rotation angle θt1 of an output shaft 32a of the turning-side motor 32 which is detected by a turning-side rotation angle sensor 44, and a rotation angle θt2 of the output shaft 32a of the turning-side motor 32 which is detected by a turning-side rotation angle sensor 45. The rotation angles θs, θt1, and θt2 are detected as relative angles in a range of 360°. The steering torque Th and the rotation angles θs, θt1, and θt2 are detected, for example, as being positive values when rightward steering is performed and as being negative values when leftward steering is performed. The rotation angles θt1 and θt2 basically have the same value when the turning-side rotation angle sensors 44 and 45 are normal.

The state quantities include a target temperature Temp which is detected by a temperature sensor 46, a lateral acceleration γ which is detected by a lateral acceleration sensor 47, and a brake operation flag Fbr indicating whether a brake which is not illustrated is being operated. The target temperature Temp is a temperature of a turning-side motor 32. The brake operation flag Fbr is input from a brake control device 48 that controls the operation of the brake.

Figure 2:
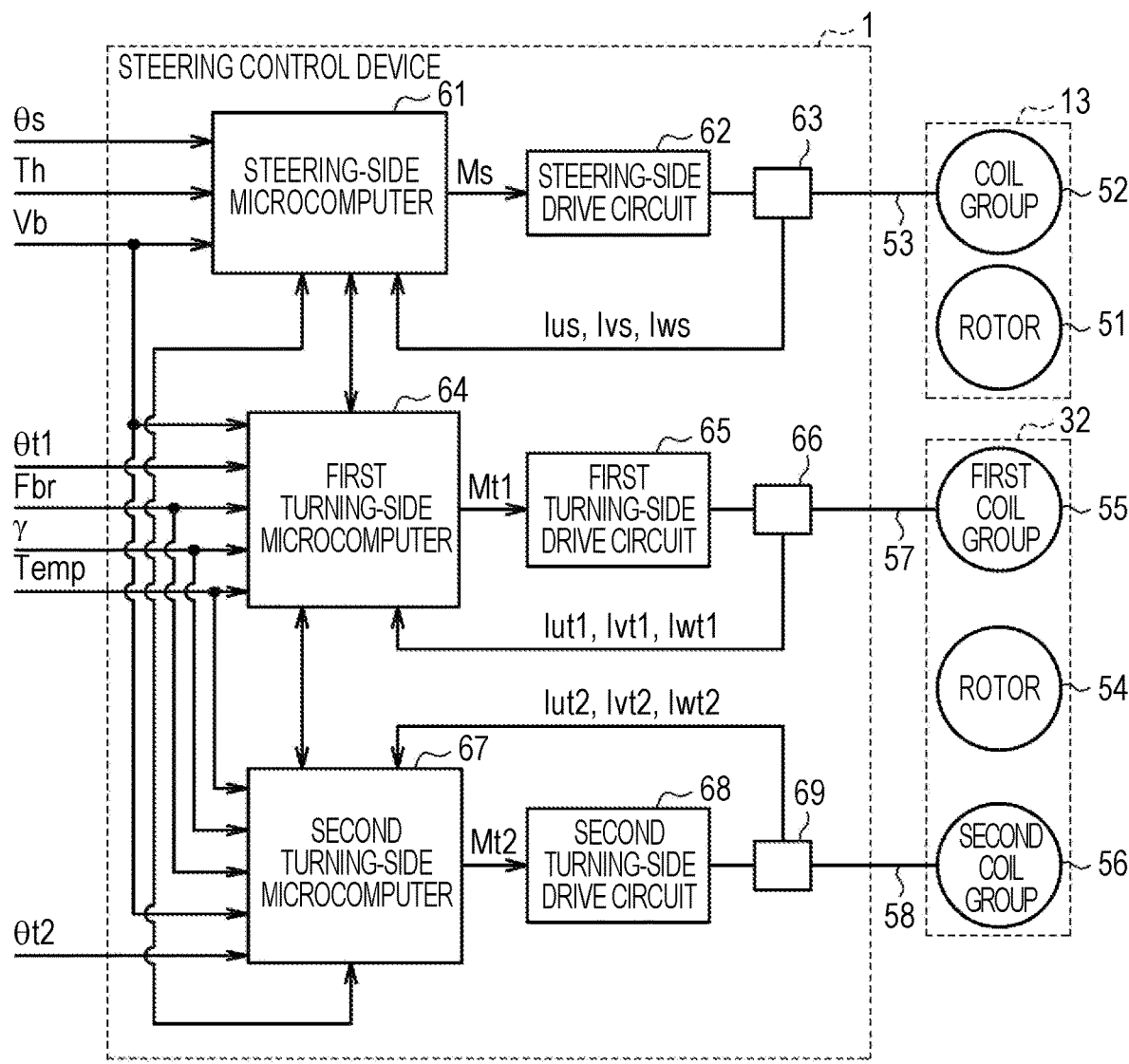
FIG. 2 is a block diagram illustrating a steering control device, a steering-side motor, and a turning-side motor.

The configurations of the steering-side motor 13 and the turning-side motor 32 will be described below. As illustrated in FIG. 2, the steering-side motor 13 includes a rotor 51 and a coil group 52 which is wound around a stator which is not illustrated. The coil group 52 includes three-phase coils of U, V, and W. Each phase coil of the coil group 52 is connected to form a single power supply path and is connected to the steering control device 1 via a connection line 53.

The turning-side motor 32 includes a rotor 54, a first coil group 55, and a second coil group 56. Each of the first coil group 55 and the second coil group 56 includes three-phase coils of U, V, and W. Each phase coil of the first coil group 55 and each phase coil of the second coil group 56 are connected to form independent power supply paths. Each phase coil of the first coil group 55 is connected to the steering control device 1 via a first connection line 57. Each phase coil of the second coil group 56 is connected to the steering control device 1 via a second connection line 58.

The configuration of the steering control device 1 will be described below in detail. The steering control device 1 includes a steering-side microcomputer 61 that outputs a steering-side motor control signal Ms and a steering-side drive circuit 62 that supplies drive electric power to the coil group 52 based on the steering-side motor control signal Ms. A rotation angle θs, a steering torque Th, and a vehicle speed Vb are input to the steering-side microcomputer 61. Current sensors 63 that detect phase current values Ius, Ivs, and Iws of the steering-side motor 13 which flow in the connection lines 53 are connected to the steering-side microcomputer 61. In FIG. 2, for the purpose of convenience of description, the connection lines 53 of phases and the current sensors 63 of phases are collectively illustrated as being single.

The steering control device 1 includes a first turning-side microcomputer 64 that is a control unit outputting a first turning-side motor control signal Mt1 and a first turning-side drive circuit 65 that supplies drive electric power to the first coil group 55 based on the first turning-side motor control signal Mt1. A rotation angle θt1, the brake operation flag Fbr, the vehicle speed Vb, the lateral acceleration γ, and the target temperature Temp are input to the first turning-side microcomputer 64. First current sensors 66 that detect phase current values Iut1, Ivt1, and Iwt1 of the turning-side motor 32 flowing in first connection lines 57 are connected to the first turning-side microcomputer 64. In FIG. 2, for the purpose of convenience of description, the first connection lines 57 of phases and the first current sensors 66 of phases are collectively illustrated as being single.

The steering control device 1 includes a second turning-side microcomputer 67 that is a control unit outputting a second turning-side motor control signal Mt2 and a second turning-side drive circuit 68 that supplies drive electric power to the second coil group 56 based on the second turning-side motor control signal Mt2. A rotation angle θt2, the brake operation flag Fbr, the vehicle speed Vb, the lateral acceleration γ, and the target temperature Temp are input to the second turning-side microcomputer 67. Second current sensors 69 that detect phase current values Iut2, Ivt2, and Iwt2 of the turning-side motor 32 flowing in second connection lines 58 are connected to the second turning-side microcomputer 67. In FIG. 2, for the purpose of convenience of description, the second connection lines 58 of phases and the second current sensors 69 of phases are collectively illustrated as being single.

That is, the steering control device 1 includes a group of the first turning-side microcomputer 64 and the first turning-side drive circuit 65 corresponding to the first coil group 55 and a group of the second turning-side microcomputer 67 and the second turning-side drive circuit 68 corresponding to the second coil group 56. The group of the first turning-side microcomputer 64 and the first turning-side drive circuit 65 controls supply of electric power to the first coil group 55. The group of the second turning-side microcomputer 67 and the second turning-side drive circuit 68 controls supply of electric power to the second coil group 56.

The steering-side microcomputer 61, the first turning-side microcomputer 64, and the second turning-side microcomputer 67 are connected to each other. Accordingly, the steering-side microcomputer 61, the first turning-side microcomputer 64, and the second turning-side microcomputer 67 transmit and receive various signals to and from each other.

The steering-side drive circuit 62, the first turning-side drive circuit 65, and the second turning-side drive circuit 68 employ, for example, a PWM inverter including a plurality of switching elements such as FETs. The steering-side motor control signal Ms, the first turning-side motor control signal Mt1, and the second turning-side motor control signal Mt2 are gate-on/off signals for prescribing ON/OFF states of the switching elements.

When the steering-side motor control signal Ms is output to the steering-side drive circuit 62, drive electric power is supplied from an onboard power supply B to the steering-side motor 13. Accordingly, the steering control device 1 controls a torque generated in the coil group 52, that is, a torque generated in the steering-side motor 13, by supplying drive electric power to the coil group 52.

When the first turning-side motor control signal Mt1 is output to the first turning-side drive circuit 65, drive electric power is supplied from the onboard power supply B to the first coil group 55. When the second turning-side motor control signal Mt2 is output to the second turning-side drive circuit 68, drive electric power is supplied from the onboard power supply B to the second coil group 56. Accordingly, the steering control device 1 controls a torque generated in the first coil group 55 by supplying drive electric power to the first coil group 55 and controls a torque generated in the second coil group 56 by supplying drive electric power to the second coil group 56. That is, a first control system and a second control system that individually control the torques generated in the first coil group 55 and the second coil group 56 are provided between the steering control device 1 and the turning-side motor 32. A torque generated in the turning-side motor 32 is a sum of the torque generated in the first coil group 55 and the torque generated in the second coil group 56. That is, the steering control device 1 controls the torque generated in the turning-side motor 32 by supplying drive electric power to the first coil group 55 and supplying drive electric power to the second coil group 56.

Figure 3:
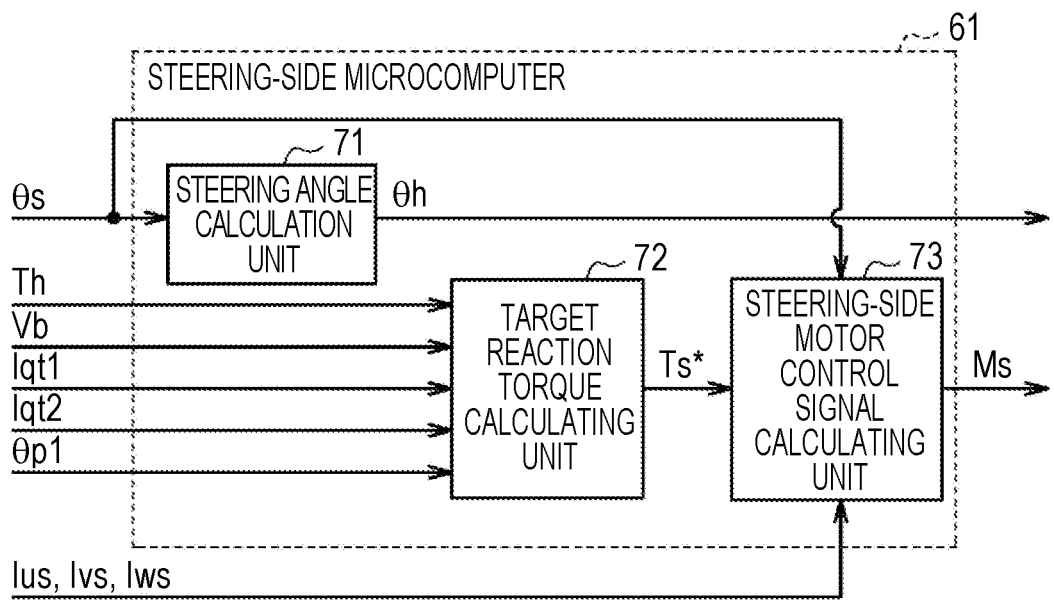
FIG. 3 is a block diagram illustrating a steering-side microcomputer.

The configuration of the steering-side microcomputer 61 will be described below. As illustrated in FIG. 3, the steering-side microcomputer 61 calculates a steering-side motor control signal Ms by performing operation processes indicated by the following control blocks in each of predetermined operation cycles. The steering torque Th, the vehicle speed Vb, the rotation angle θs, the phase current values Ius, Ivs, and Iws, and q-axis current values Iqt1 and Iqt2 which are drive currents of the turning-side motor 32, and a first turning-corresponding angle θp1 are input to the steering-side microcomputer 61. Then, the steering-side microcomputer 61 calculates the steering-side motor control signal Ms based on the state quantities.

Specifically, the steering-side microcomputer 61 includes a steering angle calculating unit 71 that calculates a steering angle θh of the steering wheel 3 based on the rotation angle θs, a target reaction torque calculating unit 72 that calculates a target reaction torque Ts*, and a steering-side motor control signal calculating unit 73 that calculates the steering-side motor control signal Ms. The target reaction torque Ts* is a target value of a motor torque which is output from the steering-side motor 13.

The rotation angle θs of the steering-side motor 13 is input to the steering angle calculating unit 71. The steering angle calculating unit 71 converts the rotation angle θs to an absolute angle in a range including a range exceeding 360°, for example, by counting the number of turns of the steering-side motor 13 from a steering neutral position, and acquires the absolute angle. The steering angle calculating unit 71 calculates the steering angle θh by multiplying the rotation angle which has been converted to the absolute angle by a first conversion factor. The first conversion factor is set in advance based on a rotation speed proportion of the steering-side reduction gear 14. The calculated steering angle θh is output to the first turning-side microcomputer 64 and the second turning-side microcomputer 67.

The steering torque Th, the vehicle speed Vb, the q-axis current values Iqt1 and Iqt2, and the first turning-corresponding angle 41 are input to the target reaction torque calculating unit 72. As will be described later, the target reaction torque calculating unit 72 calculates the target reaction torque Ts* based on the state quantities and outputs the calculated target reaction torque Ts* to the steering-side motor control signal calculating unit 73.

In addition to the target reaction torque Ts*, the rotation angle θs and the phase current values Ius, Ivs, and Iws are input to the steering-side motor control signal calculating unit 73. The steering-side motor control signal calculating unit 73 calculates a d-axis current command value Ids* on the d axis and a q-axis current command value Iqs* on the q axis in the dq coordinate system based on the target reaction torque Ts*. The current command values Ids* and Iqs* represent a current command value on the d axis and a current command value on the q axis in the dq coordinate system.

Specifically, the steering-side motor control signal calculating unit 73 calculates the q-axis current command value Iqs* of which the absolute value increases as the absolute value of the target reaction torque Ts* increases. In this embodiment, the d-axis current command value Ids* on the d axis is basically set to zero. The steering-side motor control signal calculating unit 73 calculates the steering-side motor control signal Ms by performing current feedback control in the dq coordinate system. In the following description, the word "feedback" may be referred to as "F/B."

More specifically, the steering-side motor control signal calculating unit 73 calculates a d-axis current value Ids and a q-axis current value Iqs which are actual current values of the steering-side motor 13 in the dq coordinate system by mapping the phase current values Ius, Ivs, and Iws onto the dq coordinates based on the rotation angle θs. Then, the steering-side motor control signal calculating unit 73 calculates a target voltage value based on a current difference on the d axis and a current difference on the q axis such that the d-axis current value Ids conforms to the d-axis current command value Ids* and the q-axis current value Iqs conforms to the q-axis current command value Iqs*. The steering-side motor control signal calculating unit 73 calculates the steering-side motor control signal Ms having a duty ratio (i.e., duty cycle) based on the target voltage value.

The calculated steering-side motor control signal Ms is output to the steering-side drive circuit 62. Accordingly, drive electric power corresponding to the steering-side motor control signal Ms is supplied from the steering-side drive circuit 62 to the steering-side motor 13. A motor torque indicated by the target reaction torque Ts* is generated from the coil group 52 and a steering reaction is applied to the steering wheel 3.

Figure 4:
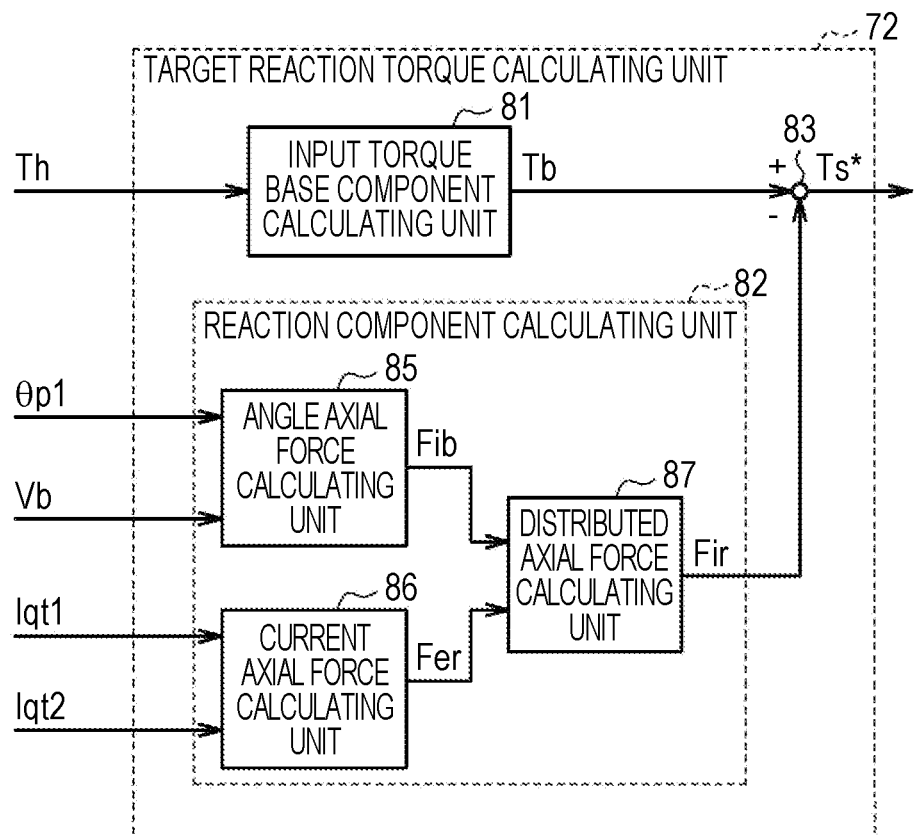
FIG. 4 is a block diagram illustrating a target reaction torque calculating unit.

The target reaction torque calculating unit 72 will be described below. As illustrated in FIG. 4, the target reaction torque calculating unit 72 includes an input torque base component calculating unit 81 that calculates an input torque base component Tb and a reaction component calculating unit 82 that calculates a reaction component Fir. The input torque base component Tb is a force for causing the steering wheel 3 to rotate in a driver's steering direction. The reaction component Fir is a force against rotation of the steering wheel 3 by a driver's steering.

Specifically, the steering torque Th is input to the input torque base component calculating unit 81. The input torque base component calculating unit 81 calculates the input torque base component Tb of which the absolute value increases as the absolute value of the steering torque Th increases. The calculated input torque base component Tb is output to a subtractor 83.

The vehicle speed Vb, the q-axis current values Iqt1 and Iqt2 of the turning-side motor 32, and the first turning-corresponding angle θp1 are input to the reaction component calculating unit 82. The reaction component calculating unit 82 calculates the reaction component Fir corresponding to an axial force applied to the rack shaft 22 based on the state quantities. The reaction component Fir corresponds to the calculational axial force obtained by estimating the axial force applied to the rack shaft 22.

Specifically, the reaction component calculating unit 82 includes an angle axial force calculating unit 85 that calculates an angle axial force Fib and a current axial force calculating unit 86 that calculates a current axial force Fer. The angle axial force Fib and the current axial force Fer are calculated in the dimension (N·m) of a torque. The reaction component calculating unit 82 includes a distributed axial force calculating unit 87 that calculates the reaction component Fir by summing the angle axial force Fib and the current axial force Fer at predetermined distribution proportions which are individually set. The predetermined distribution proportions are set such that an axial force applied to the turning wheels 5 from a road surface, that is, road surface information transmitted from the road surface, is reflected in the reaction component Fir.

The first turning-corresponding angle θ0 and the vehicle speed Vb are input to the angle axial force calculating unit 85. The angle axial force calculating unit 85 calculates the angle axial force Fib based on the first turning-corresponding angle θp1 and the vehicle speed Vb. The angle axial force Fib is an ideal value of an axial force in a model which is arbitrarily set and is an axial force that does not include road surface information, such as minute unevenness not influencing the lateral behavior of the vehicle or stepped parts influencing the lateral behavior of the vehicle.

Specifically, the angle axial force calculating unit 85 calculates the angle axial force Fib of which the absolute value increases as the absolute value of the first turning-corresponding angle θ0 increases. The angle axial force calculating unit 85 calculates the angle axial force Fib of which the absolute value increases as the vehicle speed Vb increases. The calculated angle axial force Fib is output to the distributed axial force calculating unit 87.

The q-axis current values Iqt1 and Iqt2 of the turning-side motor 32 are input to the current axial force calculating unit 86. The current axial force calculating unit 86 calculates a sum of the q-axis current value Iqt1 and the q-axis current value Iqt2, as the q-axis current value Iqt. The current axial force calculating unit 86 calculates an axial force applied to the turning wheels 5 based on the q-axis current value Iqt. The current axial force Fer is an estimated value of the axial force applied to the turning wheels 5 and is an axial force including road surface information.

Specifically, the current axial force calculating unit 86 calculates the absolute value of the current axial force Fer of which the absolute value increases as the absolute value of the q-axis current value Iqt increases. This is based on the assumption that a torque applied from the turning-side motor 32 to the rack shaft 22 and a torque based on a force applied from the road surface to the turning wheels 5 are balanced. The calculated current axial force Fer is output to the distributed axial force calculating unit 87.

The angle axial force Fib and the current axial force Fer are input to the distributed axial force calculating unit 87. In the distributed axial force calculating unit 87, a current distribution gain indicating the distribution proportion of the current axial force Fer and an angle distribution gain indicating the distribution proportion of the angle axial force Fib are set in advance by experiment or the like. The distributed axial force calculating unit 87 calculates the reaction component Fir by summing a value obtained by multiplying the angle axial force Fib by an angle distribution gain and a value obtained by multiplying the current axial force Fer by a current distribution gain. The calculated reaction component Fir is output to the subtractor 83.

The target reaction torque calculating unit 72 calculates the target reaction torque Ts* by causing the subtractor 83 to subtract the reaction component Fir from the input torque base component Tb. The calculated target reaction torque Ts* is output to the steering-side motor control signal calculating unit 73. That is, the target reaction torque calculating unit 72 calculates the target reaction torque Ts* based on the reaction component Fir which is a calculational axial force. Accordingly, a steering reaction force which is applied by the steering-side motor 13 is basically a force against a driver's steering and may be a force for assisting a driver's steering depending on a difference between the calculational axial force and the actual axial force applied to the rack shaft 22.

Figure 5:
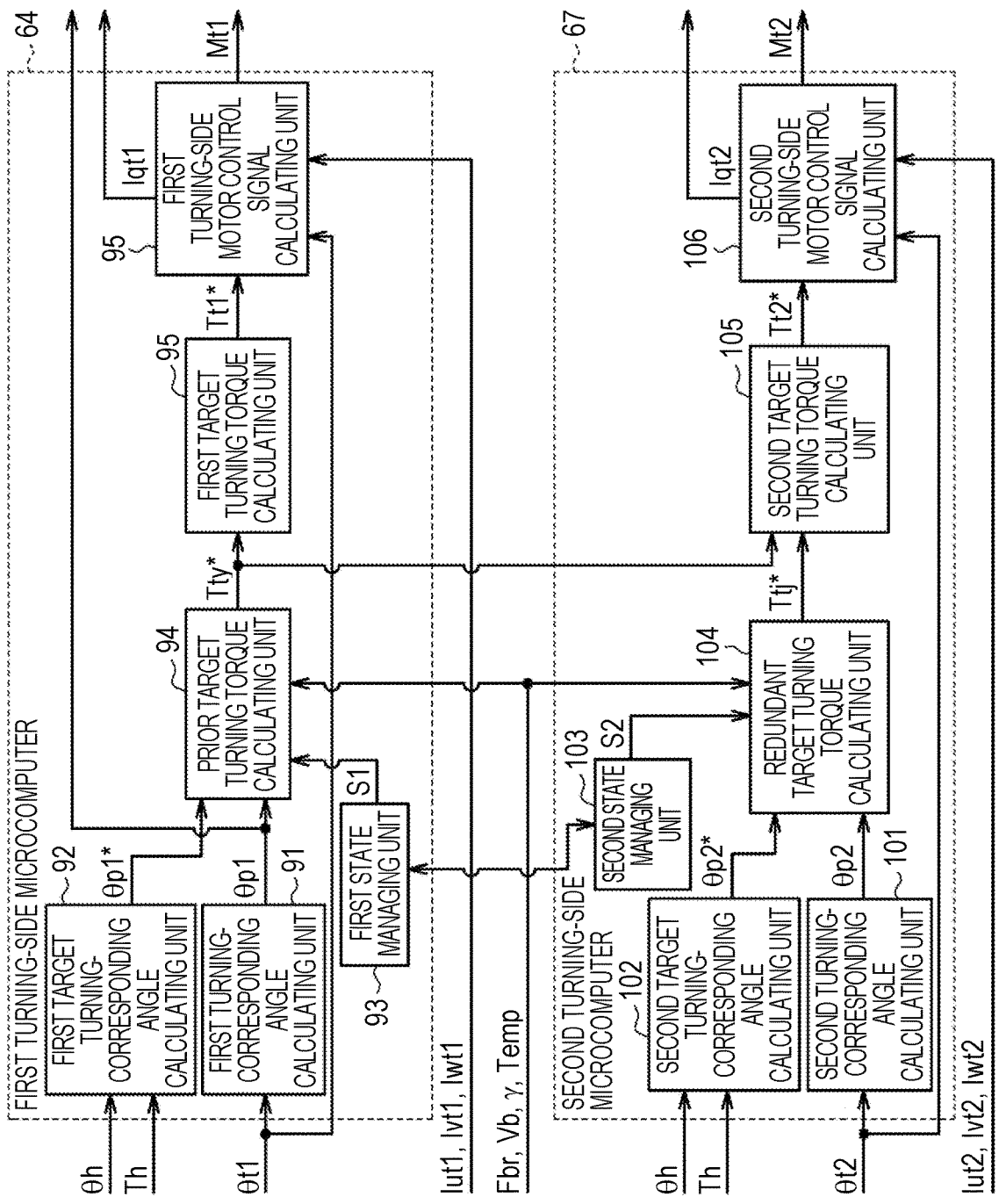
FIG. 5 is a block diagram illustrating a first turning-side microcomputer and a second turning-side microcomputer.

The first turning-side microcomputer 64 and the second turning-side microcomputer 67 will be described below with reference to FIG. 5. The first turning-side microcomputer 64 and the second turning-side microcomputer 67 change the processes of calculating the first turning-side motor control signal Mt1 and the second turning-side motor control signal Mt2 depending on a drive mode of the turning-side motor 32.

The drive mode of the turning-side motor 32 in this embodiment includes three modes, in other words, a cooperative mode, an independent mode, and a residual mode. The cooperative mode is a drive mode in which torques generated from the first coil group 55 and the second coil group 56 are controlled based on a prior target turning torque Tty* which is calculated by the first turning-side microcomputer 64. The cooperative mode is performed when the first control system for controlling the torque generated from the first coil group 55 and the second control system for controlling the torque generated from the second coil group 56 are both normal and inter-microcomputer communication between the first turning-side microcomputer 64 and the second turning-side microcomputer 67 is normal. The prior target turning torque Tty* will be described later.

The independent mode is a drive mode in which the torque generated from the first coil group 55 is controlled based on the prior target turning torque Tty* calculated by the first turning-side microcomputer 64 and the torque generated from the second coil group 56 is controlled based on a redundant target turning torque Ttj* which is calculated by the second turning-side microcomputer 67. The independent mode is performed when the first control system and the second control system are both normal and the inter-microcomputer communication is abnormal. The redundant target turning torque Ttj* will be described later.

The residual mode is performed when one of the first control system and the second control system is abnormal. The residual mode is a drive mode in which the torque generated from the first coil group 55 is controlled based on the prior target turning torque Tty* when the first control system is normal and the torque generated from the second coil group 56 is controlled based on the redundant target turning torque Ttj* when the second control system is normal.

The configuration of the first turning-side microcomputer 64 will be described below. The first turning-side microcomputer 64 calculates a first turning-side motor control signal Mt1 by performing operation processes indicated by the following control blocks in each of predetermined operation cycles. A rotation angle θt1, a steering angle θh, a steering torque Th, the phase current values Iut1, Ivt1, and Iwt1, the brake operation flag Fbr, the vehicle speed Vb, the lateral acceleration γ, and a target temperature Temp are input to the first turning-side microcomputer 64. Then, the first turning-side microcomputer 64 calculates the first turning-side motor control signal Mt1 based on the state quantities and outputs the calculated first turning-side motor control signal Mt1.

Specifically, the first turning-side microcomputer 64 includes a first turning-corresponding angle calculating unit 91 that calculates a first turning-corresponding angle θp1 based on the rotation angle θt1, a first target turning-corresponding angle calculating unit 92 that calculates a first target turning-corresponding angle θp1* based on the steering angle θh and the steering torque Th, and a first state managing unit 93 that manages the drive mode of the first control system. The first target turning-corresponding angle θp1* is a target value of the first turning-corresponding angle θp1 which is a rotation angle of the rotation shaft, that is, the pinion shaft 21, and which can be converted to the turning angle of the turning wheels 5. The first turning-side microcomputer 64 includes a prior target turning torque calculating unit 94 that calculates a prior target turning torque Tty*, a first target turning torque calculating unit 95 that calculates a first target turning torque Tt1*, and a first turning-side motor control signal calculating unit 96 that calculates a first turning-side motor control signal Mt1. The prior target turning torque Tty* is a target value of a motor torque which is output from the turning-side motor 32 and corresponds to a torque command value. Accordingly, the prior target turning torque calculating unit 94 corresponds to a torque command value calculating unit.

The rotation angle θt1 is input to the first turning-corresponding angle calculating unit 91. The first turning-corresponding angle calculating unit 91 converts the input rotation angle θt1 to an absolute angle, for example, by counting the number of turns of the turning-side motor 32 from a neutral position at which the vehicle travels straight, and acquires the absolute angle. The first turning-corresponding angle calculating unit 91 calculates the first turning-corresponding angle θp1 by multiplying the rotation angle which has been converted to the absolute angle by a second conversion factor. The second conversion factor is set in advance based on a speed reduction ratio of the transmission mechanism 33, a lead of the conversion mechanism 34, and a rotation speed proportion of the rack and pinion mechanism 24. That is, the first turning-corresponding angle θp1 corresponds to a convertible angle which can be converted to the rotation angle θt1 of the turning-side motor 32. The first turning-corresponding angle θp1 substantially matches the steering angle θh of the steering wheel 3 when it is assumed that the pinion shaft 21 is connected to the steering shaft 11. The calculated first turning-corresponding angle θp1 is output to the prior target turning torque calculating unit 94 and the target reaction torque calculating unit 72.

The steering angle θh and the steering torque Th are input to the first target turning-corresponding angle calculating unit 92. The first target turning-corresponding angle calculating unit 92 calculates the first target turning-corresponding angle θp1* based on the state quantities. The first target turning-corresponding angle calculating unit 92 calculates the first target turning-corresponding angle θp1* such that a steering angle ratio which is a ratio between the steering angle θh and the first turning-corresponding angle θp1 is basically 1:1.

Specifically, the first target turning-corresponding angle calculating unit 92 calculates, as the first target turning-corresponding angle θp1*, a value obtained by adding a compensation angle based on the steering torque Th to the steering angle θh. The compensation angle is an angle indicating a torsion of the steering shaft 11 which is caused by inputting the steering torque Th and is acquired by multiplying the steering torque Th by a preset compensation coefficient. The calculated first target turning-corresponding angle θp1* is output to the prior target turning torque calculating unit 94.

Various state quantities including the rotation angles θt1 and θt2 and the phase current values Iut1, Ivt1, Iwt1, Iut2, Ivt2, and Iwt2 are input to the first state managing unit 93. For the purpose of convenience of description, the state quantities input to the first state managing unit 93 are not illustrated. The first state managing unit 93 determines whether the first control system is normal based on the state quantities. For example, when the rotation angle θt1 has an impossible value or when an amount of change from the previous value is greater than a preset threshold value, the first state managing unit 93 determines that an abnormality has occurred in the first control system.

The first state managing unit 93 is connected to a second state managing unit 103 of the second turning-side microcomputer 67 which will be described later. The first state managing unit 93 determines whether inter-microcomputer communication between the first turning-side microcomputer 64 and the second turning-side microcomputer 67 is normal based on a signal which is transmitted and received to and from the second state managing unit 103. For example, when a signal from the second state managing unit 103 is not received or when a signal indicating that an abnormality has occurred in the second turning-side microcomputer 67 is input, the first state managing unit 93 determines that the inter-microcomputer is abnormal.

The first state managing unit 93 outputs a first state signal S1 indicating the drive mode of the turning-side motor 32 to the prior target turning torque calculating unit 94 based on the result of abnormality determination. Specifically, when the first control system and the second control system are normal and the inter-microcomputer communication is normal, the first state managing unit 93 outputs the first state signal S1 indicating that the turning-side motor 32 is to be operated in the cooperative mode. For example, when the first control system and the second control system are normal and the inter-microcomputer communication is abnormal, the first state managing unit 93 outputs the first state signal S1 indicating that the turning-side motor 32 is to be operated in the independent mode. When the second control system is abnormal, the first state managing unit 93 outputs the first state signal S1 indicating that the turning-side motor 32 is to be operated in the residual mode.

The first target turning-corresponding angle θp1*, the first turning-corresponding angle θ0, the brake operation flag Fbr, the vehicle speed Vb, the lateral acceleration γ, the target temperature Temp, and the first state signal S1 are input to the prior target turning torque calculating unit 94. The prior target turning torque calculating unit 94 calculates the prior target turning torque Tty* based on the state quantities as will be described later, and outputs the calculated prior target turning torque Tty* to the first target turning torque calculating unit 95 and the second turning-side microcomputer 67.

The prior target turning torque Tty* is input to the first target turning torque calculating unit 95. The first target turning torque calculating unit 95 calculates the first target turning torque Tt1* based on the prior target turning torque Tty*. The first target turning torque Tt1* is a torque which is to be generated from the first coil group 55 when the turning-side motor 32 generates the prior target turning torque Tty*. The first target turning torque calculating unit 95 according to this embodiment calculates a half value (50%) of the prior target turning torque Tty* as the first target turning torque Tt1*.

In addition to the first target turning torque Tt1*, the rotation angle θt1 and the phase current values Iut1, Ivt1, and Iwt1 are input to the first turning-side motor control signal calculating unit 96. The first turning-side motor control signal calculating unit 96 calculates the d-axis current command value Idt1* on the d axis and the q-axis current command value Iqt1* on the q axis in the dq coordinate system based on the first target turning torque Tt1*.

Specifically, the first turning-side motor control signal calculating unit 96 calculates the q-axis current command value Iqt1* of which the absolute value increases as the absolute value of the first target turning torque Tt1* increases. In this embodiment, the d-axis current command value Idt1* on the d axis is basically set to zero. Similarly to the steering-side motor control signal calculating unit 73, the first turning-side motor control signal calculating unit 96 calculates the first turning-side motor control signal Mt1 by performing current FB control in the dq coordinate system (i.e., based on execution of the current FB control in the dq coordinate system). The q-axis current value Iqt1 which is calculated in the process of calculating the first turning-side motor control signal Mt1 is output to the target reaction torque calculating unit 72.

The calculated first turning-side motor control signal Mt1 is output to the first turning-side drive circuit 65. Accordingly, drive electric power corresponding to the first turning-side motor control signal Mt1 is supplied to the turning-side motor 32 from the first turning-side drive circuit 65. The motor torque indicated by the first target turning torque Tt1* is generated from the first coil group 55 and a turning force is applied to the turning wheels 5 from the turning-side motor 32.

The configuration of the second turning-side microcomputer 67 will be described below. The second turning-side microcomputer 67 calculates a second turning-side motor control signal Mt2 by performing operation processes indicated by the control blocks described below in each of predetermined operation cycles. The rotation angle θt2, the steering angle θh, the steering torque Th, the phase current values Iut2, Ivt2, and Iwt2, the brake operation flag Fbr, the vehicle speed Vb, the lateral acceleration γ, and the target temperature Temp are input to the second turning-side microcomputer 67. Then, the second turning-side microcomputer 67 calculates the second turning-side motor control signal Mt2 based on the state quantities and outputs the calculated second turning-side motor control signal Mt2.

Specifically, the second turning-side microcomputer 67 is basically configured similarly to the first turning-side microcomputer 64. That is, the second turning-side microcomputer 67 includes a second turning-corresponding angle calculating unit 101 that calculates a second turning-corresponding angle θp2, a second target turning-corresponding angle calculating unit 102 that calculates a second target turning-corresponding angle θp2*, and a second state managing unit 103 that manages the drive mode of the second control system. The second turning-corresponding angle θp2 corresponds to a convertible angle which can be converted to the rotation angle θt2 of the turning-side motor 32. The second target turning-corresponding angle θp2* is a target value of the second turning-corresponding angle θp2 which is a rotation angle of the rotation shaft, that is, the pinion shaft 21, which can be converted to the turning angle of the turning wheels 5. The second turning-side microcomputer 67 includes a redundant target turning torque calculating unit 104 that calculates a redundant target turning torque Ttj*, a second target turning torque calculating unit 105 that calculates a second target turning torque Tt2*, and a second turning-side motor control signal calculating unit 106 that calculates a second turning-side motor control signal Mt2. The redundant target turning torque Ttj* is a target value of a motor torque which is output from the turning-side motor 32 and corresponds to a torque command value. Accordingly, the redundant target turning torque calculating unit 104 corresponds to a torque command value calculating unit.

The second turning-corresponding angle calculating unit 101 calculates the second turning-corresponding angle θp2 based on the rotation angle θt2 similarly to the first turning-corresponding angle calculating unit 91. The second target turning-corresponding angle calculating unit 102 calculates the second target turning-corresponding angle θp2* based on the steering angle θh and the steering torque Th similarly to the first target turning-corresponding angle calculating unit 92.

Various state quantities including the rotation angles θn and θt2 and the phase current values Iut1, Ivt1, Iwt1, Iut2, Ivt2, and Iwt2 are input to the second state managing unit 103. For the purpose of convenience of description, the state quantities input to the second state managing unit 103 are not illustrated. Similarly to the first state managing unit 93, the second state managing unit 103 calculates a second state signal S2 and outputs the calculated second state signal S2 to the redundant target turning torque calculating unit 104 and the second target turning torque calculating unit 105.

The second turning-corresponding angle θp2, the second target turning-corresponding angle θp2*, the brake operation flag Fbr, the vehicle speed Vb, the lateral acceleration γ, the target temperature Temp, and the second state signal S2 are input to the redundant target turning torque calculating unit 104. The redundant target turning torque calculating unit 104 calculates the redundant target turning torque Ttj* similarly to the prior target turning torque calculating unit 94 as will be described later.

In addition to the second state signal S2 and the redundant target turning torque Ttj*, the prior target turning torque Tty* is input to the second target turning torque calculating unit 105 when the inter-microcomputer communication is normal. When the second state signal S2 indicating that the drive mode of the turning-side motor 32 is the cooperative mode is input, the second target turning torque calculating unit 105 calculates the second target turning torque Tt2* based on the prior target turning torque Tty*. On the other hand, when the second state signal S2 indicating that the drive mode of the turning-side motor 32 is the independent mode or the residual mode is input, the second target turning torque calculating unit 105 calculates the second target turning torque Tt2* based on the redundant target turning torque Ttj*. The second target turning torque Tt2* is a torque which is to be generated from the second coil group 56 when the turning-side motor 32 generates the prior target turning torque Tty* or the redundant target turning torque Ttj*. The second target turning torque calculating unit 105 according to this embodiment calculates a half value (50%) of the prior target turning torque Tty* or the redundant target turning torque Ttj*, as the second target turning torque Tt2*.

In addition to the second target turning torque Tt2*, the rotation angle θt2 and the phase current values Iut2, Ivt2, and Iwt2 are input to the second turning-side motor control signal calculating unit 106. The second turning-side motor control signal calculating unit 106 calculates the d-axis current command value Idt2* on the d axis and the q-axis current command value Iqt2* on the q axis in the dq coordinate system based on the second target turning torque Tt2* similarly to the first turning-side motor control signal calculating unit 96. Similarly to the first turning-side motor control signal calculating unit 96, the second turning-side motor control signal calculating unit 106 calculates the second turning-side motor control signal Mt2 by performing current F/B control in the dq coordinate system (i.e., based on execution of the current F/B control in the dq coordinate system). The q-axis current value Iqt2 which is calculated in the process of calculating the second turning-side motor control signal Mt2 is output to the target reaction torque calculating unit 72.

The calculated second turning-side motor control signal Mt2 is output to the second turning-side drive circuit 68. Accordingly, drive electric power corresponding to the second turning-side motor control signal Mt2 is supplied to the turning-side motor 32 from the second turning-side drive circuit 68. The motor torque indicated by the second target turning torque Tt2* is generated from the second coil group 56 and a turning force is applied to the turning wheels 5 from the turning-side motor 32.

Figure 6:
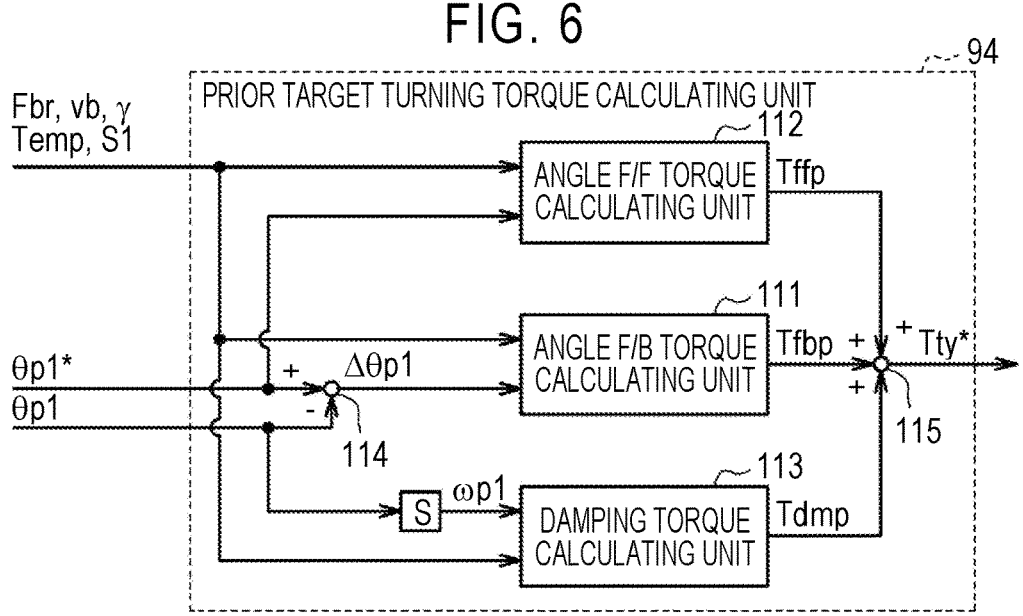
FIG. 6 is a block diagram illustrating a prior target turning torque calculating unit.

The configuration of the prior target turning torque calculating unit 94 will be described below. As illustrated in FIG. 6, the prior target turning torque calculating unit 94 calculates the prior target turning torque Tty* based on execution of angle control for adjusting the first turning-corresponding angle θ0 to the first target turning-corresponding angle θ0*. The prior target turning torque calculating unit 94 according to this embodiment performs, as angle control, angle FB control for causing the first turning-corresponding angle θ0 to conform to the first target turning-corresponding angle θp1*, feedforward control based on the first target turning-corresponding angle θp1*, and damping control based on a first turning-corresponding angular velocity ωp1 which is a rate of change of the first turning-corresponding angle θp1. The prior target turning torque calculating unit 94 changes a control gain which is used to perform the angle control based on the brake operation flag Fbr, the vehicle speed Vb, the lateral acceleration γ, the target temperature Temp, and the first state signal S1, that is, the drive mode of the turning-side motor 32. Accordingly, optimization of the angle control is achieved. In the following description, a word "feedforward" may be referred to as "F/F."

Here, as the vehicle speed Vb increases, the torque required for turning the turning wheels 5 increases. Accordingly, the degree of adjustment of the first turning-corresponding angle θp1 to the first target turning-corresponding angle θp1* with execution of the angle control changes with the change of the vehicle speed Vb, and the behavior of the vehicle in response to steering is influenced.

When a vehicle is in a deceleration state, the center of gravity of the vehicle moves forward, and thus a stability factor is likely to have a negative value and the vehicle is likely to oversteer. That is, the behavior of the vehicle in response to steering is influenced by a change in the acceleration-deceleration state of the vehicle. The stability factor is a value based on a difference between a load acting on front wheels and a load acting on rear wheels. The prior target turning torque calculating unit 94 according to this embodiment determines that the vehicle is in the deceleration state when the brake operation flag Fbr indicating that the brake is operated is input, and determines that the vehicle is not in the deceleration state (i.e., the vehicle is in a non-deceleration state) when the brake operation flag Fbr indicating that the brake is operated is not input.

As the lateral acceleration γ increases, the torque required for turning the turning wheels 5 increases. Accordingly, the degree of adjustment of the first turning-corresponding angle θp1 to the first target turning-corresponding angle θp1* with execution of the angle control changes with the change of the lateral acceleration γ, and the behavior of the vehicle in response to steering is influenced.

Here, as the target temperature Temp decreases, for example, the viscosity of grease in the turning-side motor 32 increases and thus a greater torque needs to be generated for operating the turning-side motor 32. Accordingly, the degree of adjustment of the first turning-corresponding angle θp1 to the first target turning-corresponding angle θp1* with execution of the angle control changes with the change of the target temperature Temp, and the behavior of the vehicle in response to steering is influenced.

When the drive mode of the turning-side motor 32 indicated by the first state signal S1 varies, the rotation angle θt1 of the turning-side motor 32 is not the same even if the q-axis current command value Iqt1* remains the same. That is, plant characteristics (that is, a transfer function) of a system with the q-axis current command value Iqt1* serving as an input and with the rotation angle θt1 serving as an output vary depending on the drive mode of the turning-side motor 32. In this embodiment, a great motor torque becomes less likely to be generated (the likelihood of generation of a great motor torque decreases) in the order of the independent mode, the cooperative mode, and the residual mode. When the plant characteristics change in this way, for example, the degree of adjustment of the first turning-corresponding angle θp1 to the first target turning-corresponding angle θp1* may change with the change of the target temperature Temp, and the behavior of the vehicle in response to steering may be influenced.

That is, the acceleration-deceleration state of the vehicle, the vehicle speed Vb, the lateral acceleration γ, the target temperature Temp, and the drive mode of the turning-side motor 32 correspond to factors influencing the behavior of the vehicle in response to steering. Specifically, the prior target turning torque calculating unit 94 includes an angle F/B torque calculating unit 111 that calculates an angle F/B torque Tfbp, an angle F/F torque calculating unit 112 that calculates an angle F/F torque Tffp, and a damping torque calculating unit 113 that calculates a damping torque Tdmp. The prior target turning torque calculating unit 94 calculates, as the prior target turning torque Tty*, a value obtained by summing the angle F/F torque Tffp, the angle F/B torque Tfbp, and the damping torque Tdmp.

In addition to an angle difference Δθp1 which is obtained by causing a subtractor 114 to subtract the first turning-corresponding angle θp1 from the first target turning-corresponding angle θp1*, the brake operation flag Fbr, the vehicle speed Vb, the lateral acceleration γ, the target temperature Temp, and the first state signal S1 are input to the angle F/B torque calculating unit 111. The angle F/B torque calculating unit 111 calculates the angle F/B torque Tfbp by performing angle F/B control as will be described later based on the state quantities. The calculated angle F/B torque Tfbp is output to an adder 115.

In addition to the first target turning-corresponding angle θp1*, the brake operation flag Fbr, the vehicle speed Vb, the lateral acceleration γ, the target temperature Temp, and the first state signal S1 are input to the angle F/F torque calculating unit 112. The angle F/F torque calculating unit 112 calculates the angle F/F torque Tffp by performing angle F/F control as will be described later based on the state quantities. The calculated angle F/F torque Tffp is output to the adder 115.

In addition to a first turning-corresponding angular velocity ωp1 which is obtained by differentiating the first turning-corresponding angle θp1, the brake operation flag Fbr, the vehicle speed Vb, the lateral acceleration γ, the target temperature Temp, and the first state signal S1 are input to the damping torque calculating unit 113. The damping torque calculating unit 113 calculates the damping torque Tdmp by performing damping control as will be described later based on the state quantities. The calculated damping torque Tdmp is output to the adder 115.

The prior target turning torque calculating unit 94 calculates the prior target turning torque Tty* by causing the adder 115 to sum the angle F/F torque Tffp, the angle F/B torque Tfbp, and the damping torque Tdmp.

Figure 7:
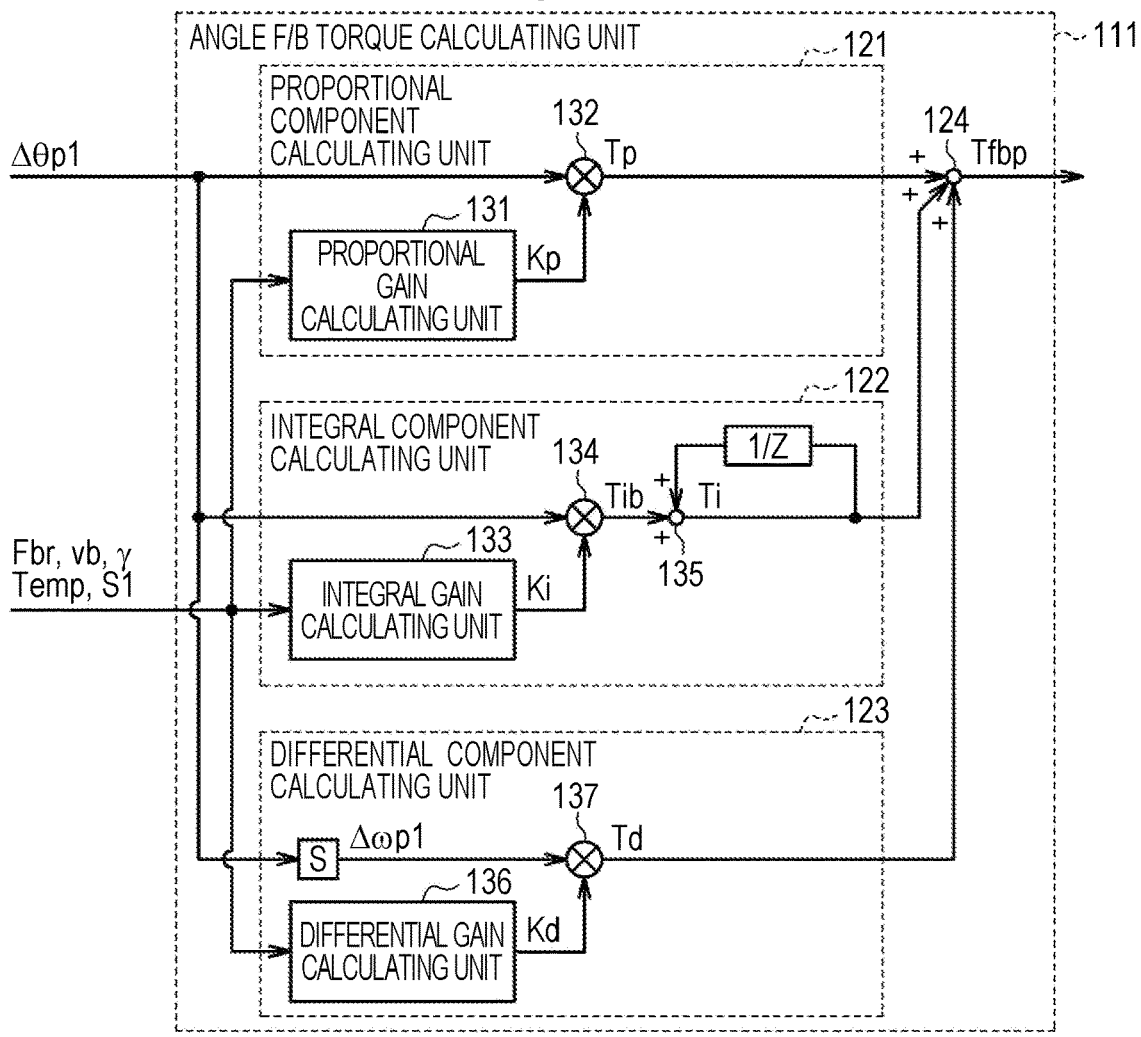
FIG. 7 is a block diagram illustrating an angle feedback torque calculating unit.

The configuration of the angle F/B torque calculating unit 111 will be described below. As illustrated in FIG. 7, the angle F/B torque calculating unit 111 calculates the angle F/B torque Tfbp by performing PID control as the angle F/B control.

Specifically, the angle F/B torque calculating unit 111 includes a proportional component calculating unit 121 that calculates a proportional component Tp, an integral component calculating unit 122 that calculates an integral component Ti, and a differential component calculating unit 123 that calculates a differential component Td. The proportional component Tp calculated by the proportional component calculating unit 121 is output to an adder 124. The integral component Ti calculated by the integral component calculating unit 122 is output to the adder 124. The differential component Td calculated by the differential component calculating unit 123 is output to the adder 124. The angle F/B torque calculating unit 111 calculates the angle F/B torque Tfbp by causing the adder 124 to sum the proportional component Tp, the integral component Ti, and the differential component Td. The proportional component calculating unit 121, the integral component calculating unit 122, and the differential component calculating unit 123 will be described below in this order.

Proportional Component Calculating Unit 121

In addition to the angle difference Δθp1, the brake operation flag Fbr, the vehicle speed Vb, the lateral acceleration γ, the target temperature Temp, and the first state signal S1 are input to the proportional component calculating unit 121. The proportional component calculating unit 121 calculates the proportional component Tp by multiplying the angle difference Δθp1 by a proportional gain Kp which is a control gain and a F/B gain based on the brake operation flag Fbr, the vehicle speed Vb, the lateral acceleration γ, the target temperature Temp, and the first state signal S1.

Specifically, the proportional component calculating unit 121 includes a proportional gain calculating unit 131 that calculates the proportional gain Kp. The brake operation flag Fbr, the vehicle speed Vb, the lateral acceleration γ, the target temperature Temp, and the first state signal S1 are input to the proportional gain calculating unit 131. The proportional gain calculating unit 131 calculates the proportional gain Kp based on the brake operation flag Fbr, the vehicle speed Vb, the lateral acceleration γ, the target temperature Temp, and the first state signal S1 and outputs the calculated proportional gain Kp to a multiplier 132. In addition to the proportional gain Kp, the angle difference Δθp1 is input to the multiplier 132. The proportional component calculating unit 121 calculates the proportional component Tp by causing the multiplier 132 to multiply the angle difference Δθp1 by the proportional gain Kp. The calculated proportional component Tp is output to an adder 124.

Figure 8:
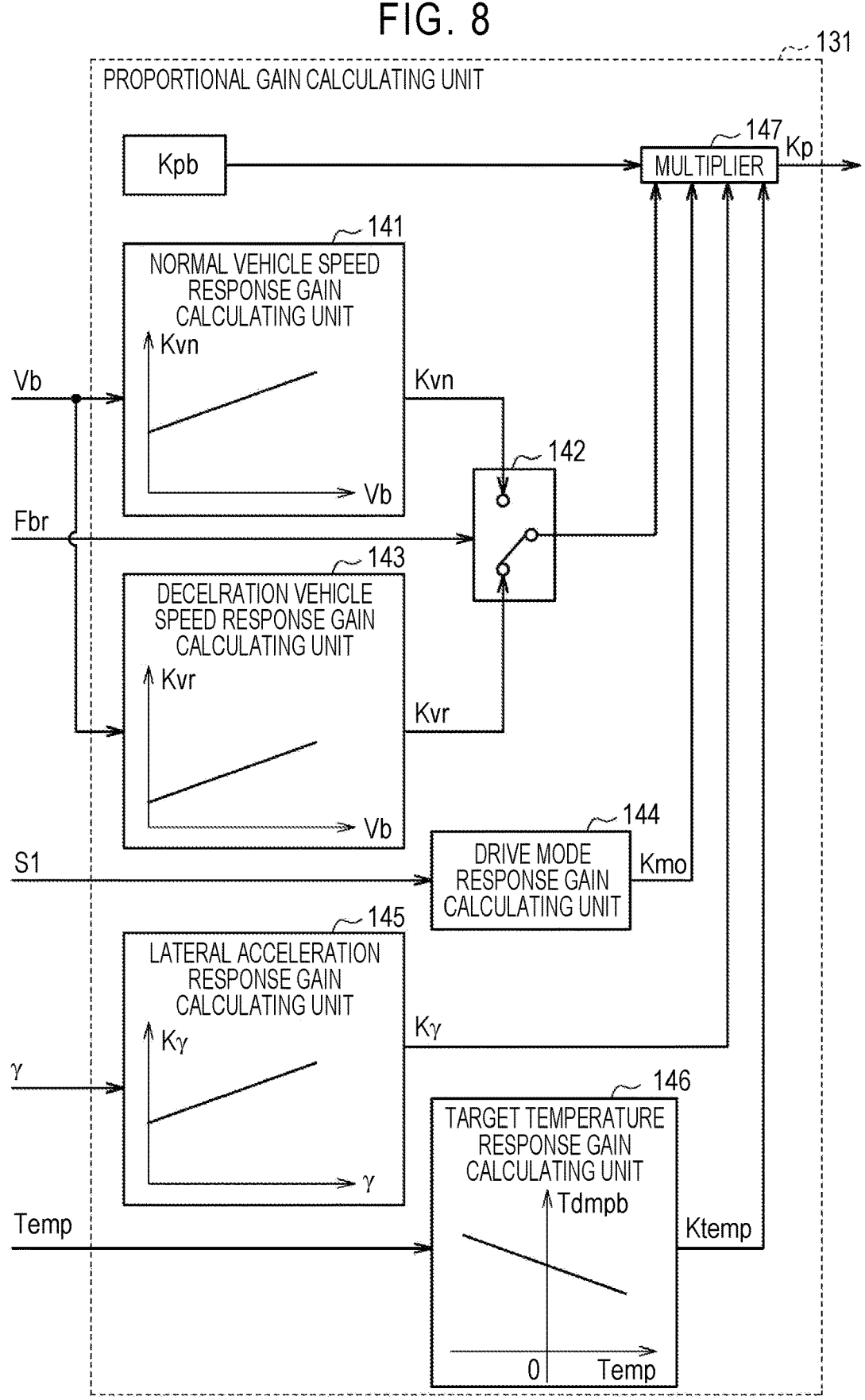
FIG. 8 is a block diagram illustrating a proportional gain calculating unit.

As illustrated in FIG. 8, the proportional gain calculating unit 131 includes a normal vehicle speed response gain calculating unit 141 that calculates a normal vehicle speed response gain Kvn, a deceleration vehicle speed response gain calculating unit 142 that calculates a deceleration vehicle speed response gain Kvr, and an output switching unit 143. The proportional gain calculating unit 131 further includes a drive mode response gain calculating unit 144 that calculates a drive mode response gain Kmo, a lateral acceleration response gain calculating unit 145 that calculates a lateral acceleration response gain Kγ, and a target temperature response gain calculating unit 146 that calculates a target temperature response gain Ktemp. The proportional gain calculating unit 131 calculates the proportional gain Kp by multiplying a proportional base gain Kpb by one of the normal vehicle speed response gain Kvn and the deceleration vehicle speed response gain Kvr, the drive mode response gain Kmo, the lateral acceleration response gain Kγ, and the target temperature response gain Ktemp.

The vehicle speed Vb is input to the normal vehicle speed response gain calculating unit 141. The normal vehicle speed response gain calculating unit 141 includes a map in which a relationship between the vehicle speed Vb and the normal vehicle speed response gain Kvn is defined. The normal vehicle speed response gain calculating unit 141 calculates the normal vehicle speed response gain Kvn corresponding to the vehicle speed Vb with reference to the map. In the map, the normal vehicle speed response gain Kvn is set to have a value greater than zero when the vehicle speed Vb is zero. In the map, the normal vehicle speed response gain Kvn is set to increase linearly with an increase of the absolute value of the vehicle speed Vb. The calculated normal vehicle speed response gain Kvn is output to the output switching unit 143.

The vehicle speed Vb is input to the deceleration vehicle speed response gain calculating unit 142. The deceleration vehicle speed response gain calculating unit 142 includes a map in which a relationship between the vehicle speed Vb and the deceleration vehicle speed response gain Kvr is defined. The deceleration vehicle speed response gain calculating unit 142 calculates the deceleration vehicle speed response gain Kvr corresponding to the vehicle speed Vb with reference to the map. In the map, the deceleration vehicle speed response gain Kvr is set to have a value greater than zero when the vehicle speed Vb is zero. In the map, the deceleration vehicle speed response gain Kvr is set to increase linearly with an increase of the absolute value of the vehicle speed Vb. The deceleration vehicle speed response gain Kvr is set to be smaller than the normal vehicle speed response gain Kvn at an arbitrary vehicle speed Vb. The calculated deceleration vehicle speed response gain Kvr is output to the output switching unit 143.

The normal vehicle speed response gain Kvn, the deceleration vehicle speed response gain Kvr, and the brake operation flag Fbr are input to the output switching unit 143. When the brake operation flag Fbr indicating that the brake is operated is not input, the output switching unit 143 outputs the normal vehicle speed response gain Kvn to a multiplier 147. On the other hand, when the brake operation flag Fbr indicating that the brake is operated is input, the output switching unit 143 outputs the deceleration vehicle speed response gain Kvr to the multiplier 147. That is, the proportional gain calculating unit 131 decreases the proportional gain Kp by outputting the deceleration vehicle speed response gain Kvr which is smaller than the normal vehicle speed response gain Kvn when the vehicle is in the deceleration state.

The first state signal S1 is input to the drive mode response gain calculating unit 144. The drive mode response gain calculating unit 144 calculates a drive mode response gain Kmo corresponding to the drive mode indicated by the first state signal S1. In the drive mode response gain calculating unit 144, the drive mode response gain Kmo corresponding to the drive mode is set in advance. The drive mode response gain Kmo is set to increase in the order of the independent mode, the cooperative mode, and the residual mode. The calculated drive mode response gain Kmo is output to a multiplier 147

The lateral acceleration γ is input to the lateral acceleration response gain calculating unit 145. The lateral acceleration response gain calculating unit 145 includes a map in which a relationship between the lateral acceleration γ and the lateral acceleration response gain Kγ is defined. The lateral acceleration response gain calculating unit 145 calculates the lateral acceleration response gain Kγ corresponding to the lateral acceleration γ with reference to the map. In the map, the lateral acceleration response gain Kγ is set to have a value greater than zero when the lateral acceleration γ is zero. In the map, the lateral acceleration response gain Kγ is set to increase linearly with an increase of the absolute value of the lateral acceleration γ. The calculated lateral acceleration response gain Kγ is output to the multiplier 147.

The target temperature Temp is input to the target temperature response gain calculating unit 146. The target temperature response gain calculating unit 146 includes a map in which a relationship between the target temperature Temp and the target temperature response gain Ktemp is defined. The target temperature response gain calculating unit 146 calculates the target temperature response gain Ktemp corresponding to the target temperature Temp with reference to the map. In the map, the target temperature response gain Ktemp is set to have a value greater than zero when the target temperature Temp is zero. In the map, the target temperature response gain Ktemp is set to increase linearly with a decrease of the target temperature Temp. The calculated target temperature response gain Ktemp is output to the multiplier 147.

In addition to one of the normal vehicle speed response gain Kvn and the deceleration vehicle speed response gain Kvr, the drive mode response gain Kmo, the lateral acceleration response gain Kγ, and the target temperature response gain Ktemp, a proportional base gain Kpb which is a preset constant is input to the multiplier 147. The proportional gain calculating unit 131 calculates the proportional gain Kp by causing the multiplier 147 to multiply the proportional base gain Kpb by one of the normal vehicle speed response gain Kvn and the deceleration vehicle speed response gain Kvr, the drive mode response gain Kmo, the lateral acceleration response gain Kγ, and the target temperature response gain Ktemp. The calculated proportional gain Kp is output to the multiplier 132 illustrated in FIG. 7.

Integral Component Calculating Unit 122

As illustrated in FIG. 7, in addition to the angle difference Δθp1, the brake operation flag Fbr, the vehicle speed Vb, the lateral acceleration γ, the target temperature Temp, and the first state signal S1 are input to the integral component calculating unit 122. The integral component calculating unit 122 calculates an integral base component Tib by multiplying the angle difference Δθp1 by an integral gain Ki which is a control gain and a FB gain based on the brake operation flag Fbr, the vehicle speed Vb, the lateral acceleration γ, the target temperature Temp, and the first state signal S1. The integral component calculating unit 122 calculates the integral component Ti by adding an integrated value obtained by integrating values of the integral base component Tib calculated up to the previous operation cycle, to the integral base component Tib calculated in the newest operation cycle.

Specifically, the integral component calculating unit 122 includes an integral gain calculating unit 133 that calculates the integral gain Ki. The brake operation flag Fbr, the vehicle speed Vb, the lateral acceleration γ, the target temperature Temp, and the first state signal S1 are input to the integral gain calculating unit 133. The integral gain calculating unit 133 calculates the integral gain Ki based on the brake operation flag Fbr, the vehicle speed Vb, the lateral acceleration γ, the target temperature Temp, and the first state signal S1 and outputs the calculated integral gain Ki to a multiplier 134. In addition to the integral gain Ki, the angle difference Δθp1 is input to the multiplier 134. The integral component calculating unit 122 calculates the integral base component Tib by causing the multiplier 134 to multiply the angle difference Δθp1 by the integral gain Ki. The calculated integral base component Tib is output to an adder 135. In addition to the integral base component Tib, an integrated value obtained by integrating values of the integral base component Tib calculated up to the previous operation cycle is input to the adder 135. The integral component calculating unit 122 calculates the integral component Ti by causing the adder 135 to add the integrated value to the integral base component Tib.

The integral gain calculating unit 133 calculates the integral gain Ki similarly to the proportional gain calculating unit 131. That is, the integral gain calculating unit 133 calculates the integral gain Ki by multiplying the integral base gain Kib by the one of the normal vehicle speed response gain Kvn and the deceleration vehicle speed response gain Kvr, the drive mode response gain Kmo, the lateral acceleration response gain Kγ, and the target temperature response gain Ktemp. The one of the normal vehicle speed response gain Kvn and the deceleration vehicle speed response gain Kvr, the drive mode response gain Kmo, the lateral acceleration response gain Kγ, and the target temperature response gain Ktemp, by which the integral base gain Kib is multiplied, may have the same values as the gains by which the proportional base gain Kpb is multiplied, or values which are different therefrom.

Differential Component Calculating Unit 123

In addition to the angle difference Δθp1, the brake operation flag Fbr, the vehicle speed Vb, the lateral acceleration γ, the target temperature Temp, and the first state signal S1 are input to the differential component calculating unit 123. The differential component calculating unit 123 calculates the differential component Td by multiplying an angular velocity difference Δωp1 obtained by differentiating the angle difference Δθp1 by a differential gain Kd which is a control gain and a FB gain corresponding to the brake operation flag Fbr, the vehicle speed Vb, the lateral acceleration γ, the target temperature Temp, and the first state signal S1.

Specifically, the differential component calculating unit 123 includes a differential gain calculating unit 136 that calculates the differential gain Kd. The brake operation flag Fbr, the vehicle speed Vb, the lateral acceleration γ, the target temperature Temp, and the first state signal S1 are input to the differential gain calculating unit 136. The differential gain calculating unit 136 calculates the differential gain Kd based on the brake operation flag Fbr, the vehicle speed Vb, the lateral acceleration γ, the target temperature Temp, and the first state signal S1 and outputs the calculated differential gain Kd to a multiplier 137. In addition to the differential gain Kd, the angular velocity difference Δωp1 is input to the multiplier 137. The differential component calculating unit 123 calculates the differential component Td by causing the multiplier 137 to multiply the angular velocity difference Δωp1 by the differential gain Kd.

The differential gain calculating unit 136 calculates the differential gain Kd similarly to the proportional gain calculating unit 131. That is, the differential gain calculating unit 136 calculates the differential gain Kd by multiplying a differential base gain Kdb by the one of the normal vehicle speed response gain Kvn and the deceleration vehicle speed response gain Kvr, the drive mode response gain Kmo, the lateral acceleration response gain Kγ, and the target temperature response gain Ktemp. The one of the normal vehicle speed response gain Kvn and the deceleration vehicle speed response gain Kvr, the drive mode response gain Kmo, the lateral acceleration response gain Kγ, and the target temperature response gain Ktemp, by which the differential base gain Kdb is multiplied, may have the same values as the gains by which the proportional base gain Kpb is multiplied, or values which are different therefrom. The calculated differential gain Kd is output to the multiplier 137.

As described above, the angle F/B torque calculating unit 111 calculates the angle F/B torque Tfbp while changing the proportional gain Kp, the integral gain Ki, and the differential gain Kd based on the factors influencing the behavior of the vehicle in response to steering.

Figure 9:
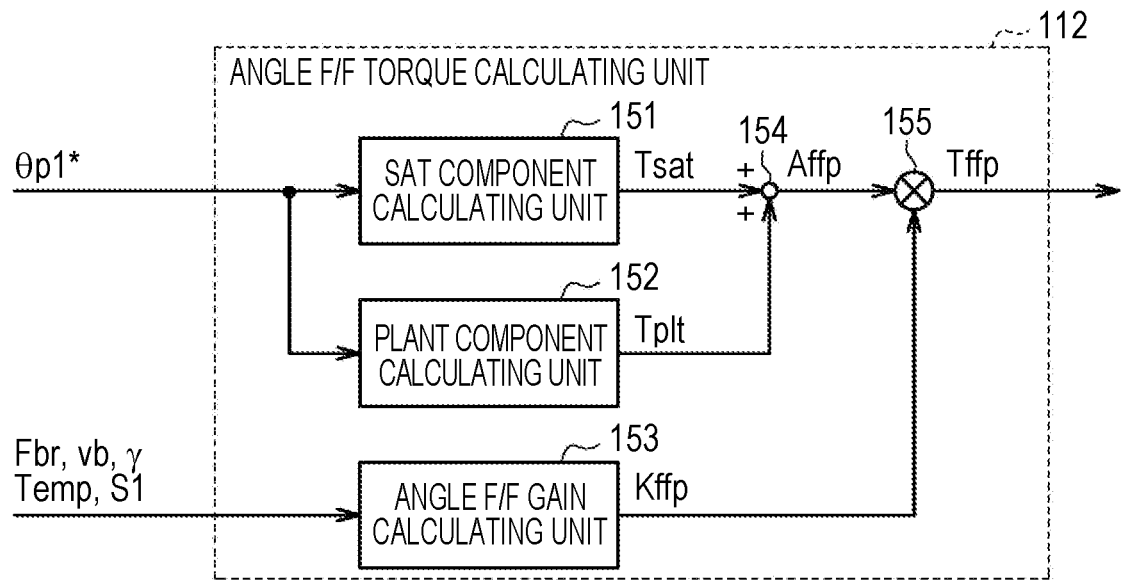
FIG. 9 is a block diagram illustrating an angle feedforward torque calculating unit.

The configuration of the angle F/F torque calculating unit 112 will be described below. As illustrated in FIG. 9, the angle F/F torque calculating unit 112 includes a SAT component calculating unit 151 that calculates an SAT component Tsat, a plant component calculating unit 152 that calculates a plant component Tplt, and an angle F/F gain calculating unit 153 that calculates an angle F/F gain Kffp. The SAT component Tsat represents a torque for compensating for disturbance corresponding to a self-aligning torque applied to the turning wheels 5. The plant component Tplt represents a torque for compensating for disturbance based on plant characteristics of a system with the q-axis current command value Iqt1* for the turning-side motor 32 serving as an input and with the first turning-corresponding angle θ0 serving as an output. The angle F/F torque calculating unit 112 calculates the angle F/F torque Tffp by multiplying an added value, which is obtained by summing (adding up) the SAT component Tsat and the plant component Tplt, by the angle F/F gain Kffp.

Specifically, the first target turning-corresponding angle θ0* is input to the SAT component calculating unit 151. The SAT component calculating unit 151 calculates the SAT component Tsat by multiplying the first target turning-corresponding angle θp1* by a preset SAT coefficient. The SAT coefficient is a coefficient representing a relationship between the self-aligning torque applied to the turning wheels 5 and the first turning-corresponding angle θ0 and is set in advance. The calculated SAT component Tsat is output to an adder 154.

The first target turning-corresponding angle θ0* is input to the plant component calculating unit 152. The plant component calculating unit 152 calculates, as the plant component Tplt, an output which is obtained by inputting the first target turning-corresponding angle θ0* to a preset transmission function representing the plant characteristics of the system. The calculated plant component Tplt is output to the adder 154.

The brake operation flag Fbr, the vehicle speed Vb, the lateral acceleration γ, the target temperature Temp, and the first state signal S1 are input to the angle F/F gain calculating unit 153. The angle F/F gain calculating unit 153 calculates the angle F/F gain Kffp similarly to the proportional gain calculating unit 131. That is, the angle F/F gain calculating unit 153 calculates the angle F/F gain Kffp by multiplying an F/F base gain Kffbp by the one of the normal vehicle speed response gain Kvn and the deceleration vehicle speed response gain Kvr, the drive mode response gain Kmo, the lateral acceleration response gain Kγ, and the target temperature response gain Ktemp. The one of the normal vehicle speed response gain Kvn and the deceleration vehicle speed response gain Kvr, the drive mode response gain Kmo, the lateral acceleration response gain Kγ, and the target temperature response gain Ktemp, by which the F/F base gain Kffbp is multiplied, may have the same values as the gains by which the proportional base gain Kpb is multiplied, or values which are different therefrom. The calculated angle F/F gain Kffp is output to a multiplier 155.

The angle F/F torque calculating unit 112 calculates an added value Affp by causing the adder 154 to sum (add up) the SAT component Tsat and the plant component Tplt. The calculated added value Affp is output to the multiplier 155. The angle F/F torque calculating unit 112 calculates the angle F/F torque Tffp by causing the multiplier 155 to multiply the added value Affp by the angle F/F gain Kffp. In this way, the angle F/F torque calculating unit 112 calculates the angle F/F torque Tffp while changing the angle F/F gain Kffp based on the factors influencing the behavior of the vehicle in response to steering.

Figure 10:
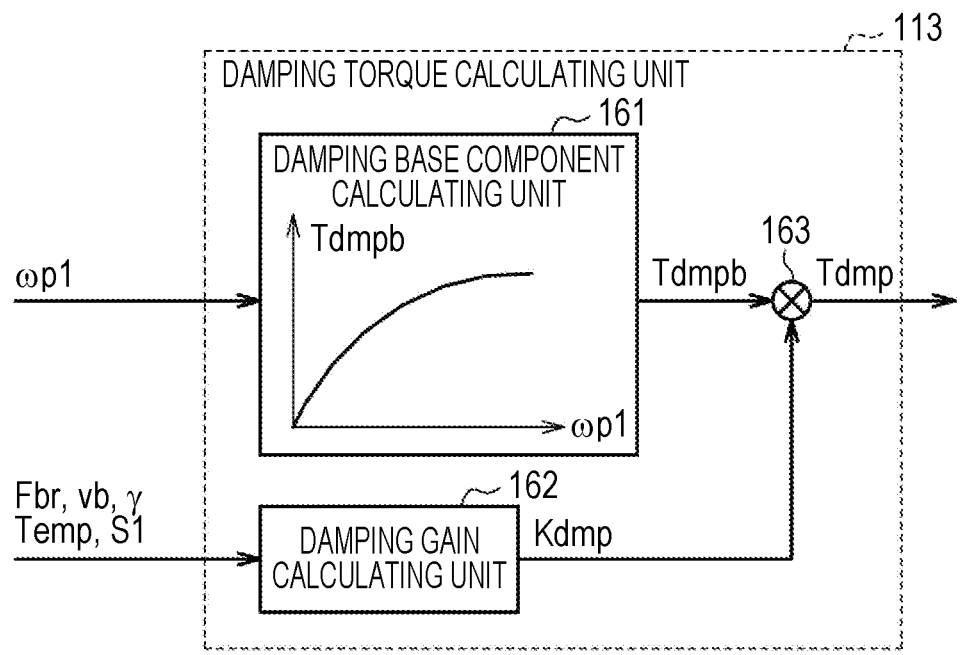
FIG. 10 is a block diagram illustrating a damping torque calculating unit.

The configuration of the damping torque calculating unit 113 will be described below. As illustrated in FIG. 10, the damping torque calculating unit 113 includes a damping base component calculating unit 161 that calculates a damping base component Tdmpb and a damping gain calculating unit 162 that calculates a damping gain Kdmp. The damping torque calculating unit 113 calculates the damping torque Tdmp by multiplying the damping base component Tdmpb by the damping gain Kdmp.

Specifically, the first turning-corresponding angular velocity ωp1 is input to the damping base component calculating unit 161. The damping gain calculating unit 162 includes a map in which a relationship between the first turning-corresponding angular velocity ωp1 and the damping base component Tdmpb is defined. The damping base component calculating unit 161 calculates the damping base component Tdmpb of which the absolute value corresponds to the first turning-corresponding angular velocity ωp1 with reference to the map. The damping base component calculating unit 161 sets the sign of the damping base component Tdmpb to the same sign as that of the first turning-corresponding angular velocity ωp1. In the map, the damping base component Tdmpb is set to be zero when the first turning-corresponding angular velocity ωp1 is zero. In the map, the damping base component Tdmpb is set to increase with an increase in the absolute value of the first turning-corresponding angular velocity ωp1. The calculated damping base component Tdmpb is output to a multiplier 163.

The brake operation flag Fbr, the vehicle speed Vb, the lateral acceleration γ, the target temperature Temp, and the first state signal S1 are input to the damping gain calculating unit 162. The damping gain calculating unit 162 calculates the damping gain Kdmp similarly to the proportional gain calculating unit 131. That is, the damping gain calculating unit 162 calculates the damping gain Kdmp by multiplying the damping base gain Kdmpb by the one of the normal vehicle speed response gain Kvn and the deceleration vehicle speed response gain Kvr, the drive mode response gain Kmo, the lateral acceleration response gain Kγ, and the target temperature response gain Ktemp. The one of the normal vehicle speed response gain Kvn and the deceleration vehicle speed response gain Kvr, the drive mode response gain Kmo, the lateral acceleration response gain Kγ, and the target temperature response gain Ktemp, by which the damping base gain Kdmpb is multiplied, may have the same values as the gains by which the proportional base gain Kpb is multiplied, or values which are different therefrom. The calculated damping gain Kdmp is output to the multiplier 163.

The damping torque calculating unit 113 calculates the damping torque Tdmp by causing the multiplier 163 to multiply the damping base component Tdmpb by the damping gain Kdmp. In this way, the damping torque calculating unit 113 calculates the damping torque Tdmp while changing the damping gain Kdmp based on the factors influencing the behavior of the vehicle in response to steering.

As described above, the prior target turning torque calculating unit 94 calculates the angle FB torque Tfbp, the angle F/F torque Tffp, and the damping torque Tdmp corresponding to the factors influencing the behavior of the vehicle in response to steering by changing the control gain and calculates the prior target turning torque Tty* based thereon. Accordingly, it is possible to achieve optimization of angle control.

The redundant target turning torque calculating unit 104 calculates the redundant target turning torque Ttj* similarly to the prior target turning torque calculating unit 94. Accordingly, it is possible to achieve optimization of angle control. Operations and advantages of this embodiment will be described below.

(1) Each of the prior target turning torque calculating unit 94 and the redundant target turning torque calculating unit 104 changes the control gain which is used for the angle control based on the brake operation flag Fbr, the vehicle speed Vb, the lateral acceleration γ, the target temperature Temp, and the drive mode of the turning-side motor 32. Accordingly, it is possible to optimize the angle control according to the factors influencing the behavior of the vehicle in response to steering and to achieve optimization of the behavior of the vehicle in response to steering.

(2) Since the prior target turning torque calculating unit 94 changes the control gain according to the drive mode of the turning-side motor 32, it is possible to optimize the angle control and to achieve optimization of the behavior of the vehicle in response to steering even when a degree of adjustment of the first turning-corresponding angle θp1 to the first target turning-corresponding angle θp1* due to execution of the angle control is changed by changing the drive mode. Similarly, since the redundant target turning torque calculating unit 104 changes the control gain according to the drive mode of the turning-side motor 32, it is possible to optimize the angle control and to achieve optimization of the behavior of the vehicle in response to steering.

(3) Since each of the prior target turning torque calculating unit 94 and the redundant target turning torque calculating unit 104 increases the control gain in the order of the independent mode, the cooperative mode, and the residual mode, it is possible to perform optimal angle control according to the drive mode of the turning-side motor 32.

(4) Since each of the prior target turning torque calculating unit 94 and the redundant target turning torque calculating unit 104 increases the control gain with the increase of the vehicle speed Vb, it is possible to perform optimal angle control according to the vehicle speed Vb.

(5) Since each of the prior target turning torque calculating unit 94 and the redundant target turning torque calculating unit 104 changes the control gain such that the control gain is smaller when the vehicle is in the deceleration state than when the vehicle is in a non-deceleration state, it is possible to curb oversteering and to achieve improvement in a steering feeling.

(6) Since each of the prior target turning torque calculating unit 94 and the redundant target turning torque calculating unit 104 increases the control gain with the increase of the absolute value of the lateral acceleration γ, it is possible to perform optimal angle control according to the lateral acceleration γ.

(7) Since each of the prior target turning torque calculating unit 94 and the redundant target turning torque calculating unit 104 increases the control gain with the decrease of the target temperature Temp, it is possible to perform optimal angle control according to the target temperature Temp.

(8) The prior target turning torque calculating unit 94 performs, as the angle control, angle F/B control for causing the first turning-corresponding angle θ0 to conform to the first target turning-corresponding angle θ0*, angle F/F control based on the first target turning-corresponding angle θ0*, and damping control based on the first turning-corresponding angular velocity ωp1 which is a rate of change of the first turning-corresponding angle θp1. The control gain which is changed based on the brake operation flag Fbr, the vehicle speed Vb, the lateral acceleration γ, the target temperature Temp, and the drive mode includes the proportional gain Kp, the integral gain Ki, the differential gain Kd, the angle F/F gain Kffp, and the damping gain Kdmp. Accordingly, it is possible to appropriately adjust the first turning-corresponding angle θ0 to the first target turning-corresponding angle θp1*. Similarly, since the redundant target turning torque calculating unit 104 performs the angle F/B control, the angle F/F control, and the damping control, it is possible to appropriately adjust the second turning-corresponding angle θp2 to the second target turning-corresponding angle θp2*.

This embodiment can be modified as follows. The embodiment and the following modified examples can be combined unless technical contradiction arises. In the embodiment, the turning-side motor 32 includes the first coil group 55 and the second coil group 56, but the disclosure is not limited thereto. For example, the turning-side actuator 31 may include a plurality of turning-side motors. This configuration is equivalent to a configuration in which a motor that applies a motor torque to the steering device includes a plurality of coil groups with different power supply paths.

In the aforementioned embodiment, the turning-side motor 32 may include a plurality of coil groups with three or more different power supply paths and the steering control device 1 may include groups each including a turning-side microcomputer and a turning-side drive circuit such that the number of the groups is the same as the number of the coil groups. The turning-side motor 32 may include only one coil group and the steering control device 1 may include only one group including a turning-side microcomputer and a turning-side drive circuit. That is, the configuration for applying a motor torque to the turning unit 6 may not be redundant.

In the aforementioned embodiment, the steering-side motor 13 may include a plurality of coil groups with two or more different power supply paths and the steering control device 1 may include groups each including a steering-side microcomputer and a steering-side drive circuit such that the number of the groups are the same as the number of the coil groups.

In the aforementioned embodiment, the angle axial force calculating unit 85 may calculate the angle axial force Fib using the second turning-corresponding angle θp2 instead of the first turning-corresponding angle θp1. In the aforementioned embodiment, a mode other than the cooperative mode, the independent mode, and the residual mode may be employed as the drive mode of the turning-side motor 32. For example, a drive mode in which the absolute values of the q-axis current command value Iqt1* and the q-axis current command value Iqt2* are limited to curb overheating of the turning-side motor 32 when the temperature of the turning-side motor 32 is equal to or higher than a threshold value may be employed.

In the aforementioned embodiment, the temperature of the turning-side motor 32 detected by the temperature sensor 46 is used as the target temperature Temp, but the disclosure is not limited thereto. For example, an estimated temperature of the turning-side motor 32 which is estimated based on the q-axis current value Iqt may be used as the target temperature. Instead of the temperature of the turning-side motor 32, one or more other temperatures such as the temperature of the first turning-side microcomputer 64, the temperature of the second turning-side microcomputer 67, the temperature of the first turning-side drive circuit 65, the temperature of the second turning-side drive circuit 68, the temperature of the steering device 2, and/or an ambient temperature around the steering device 2 may be used as the target temperature(s).

In the aforementioned embodiment, the abnormality detecting method which is performed by the first state managing unit 93 and the second state managing unit 103 can be appropriately modified. In the aforementioned embodiment, when the vehicle is in the deceleration state, the control gain is decreased by outputting the deceleration vehicle speed response gain Kvr which is smaller than the normal vehicle speed response gain Kvn. However, the disclosure is not limited thereto and the control gain may be decreased, for example, by outputting a deceleration response gain which varies depending on whether the vehicle is in the deceleration state to the multiplier 147, and the calculation method can be appropriately modified.

In the aforementioned embodiment, whether the vehicle is in the deceleration state is determined based on the brake operation flag Fbr, but the disclosure is not limited thereto. For example, a longitudinal acceleration in a vehicle longitudinal direction (i.e., a vehicle front-rear direction) may be detected and it may be determined that the vehicle is in the deceleration state when the longitudinal acceleration is less than a preset threshold value.

In the aforementioned embodiment, the input torque base component calculating unit 81 may calculate the input torque base component Tb, for example, based on the steering torque Th and the vehicle speed Vb. In this case, for example, the input torque base component calculating unit 81 calculates the input torque base component Tb of which the absolute value increases as the vehicle speed Vb decreases.

In the aforementioned embodiment, the execution mode of angle control can be appropriately modified. For example, at least one of the angle F/F control and the damping control may not be performed. In the aforementioned embodiment, the angle F/B torque calculating unit 111 performs PID control as the angle F/B control, but the disclosure is not limited thereto and, for example, PI control may be performed. The execution mode of angle F/B control can be appropriately modified.

In the aforementioned embodiment, the angle F/F torque calculating unit 112 may calculate the angle F/F torque Tffp based on only one of the SAT component Tsat and the plant component Tplt.

In the aforementioned embodiment, the proportional gain Kp, the integral gain Ki, the differential gain Kd, the angle F/F gain Kffp, and the damping gain Kdmp are changed based on the brake operation flag Fbr, the vehicle speed Vb, the lateral acceleration γ, the target temperature Temp, and the drive mode of the turning-side motor 32, but the disclosure is not limited thereto. As long as at least one of the control gains is changed based on the brake operation flag Fbr, the vehicle speed Vb, the lateral acceleration γ, the target temperature Temp, and the drive mode, the other control gains may not be changed.

In the aforementioned embodiment, the proportional gain Kp is changed based on the brake operation flag Fbr, the vehicle speed Vb, the lateral acceleration γ, the target temperature Temp, and the drive mode of the turning-side motor 32. However, the proportional gain Kp may not be changed based on all of the brake operation flag Fbr, the vehicle speed Vb, the lateral acceleration γ, the target temperature Temp, and the drive mode, and the proportional gain Kp may be changed based on at least one of the brake operation flag Fbr, the vehicle speed Vb, the lateral acceleration γ, the target temperature Temp, and the drive mode. The same is applied to the integral gain Ki, the differential gain Kd, the angle F/F gain Kffp, and the damping gain Kdmp.

In the aforementioned embodiment, the target reaction torque calculating unit 72 may calculate the target reaction torque Ts* based on execution of angle control for adjusting the steering angle θh to the target steering angle, and a control gain which is used for the angle control may be changed similarly to the control gain which is used for the angle control which is performed by each of the prior target turning torque calculating unit 94 and the redundant target turning torque calculating unit 104.

In the aforementioned embodiment, an interior permanent magnet synchronous motor (IPMSM) may be used as the steering-side motor 13. An interior permanent magnet synchronous motor may be used as the turning-side motor 32. In the aforementioned embodiment, the steering device 2 to be controlled has a linkless structure in which transmission of power between the steering unit 4 and the turning unit 6 is cut off, but the disclosure is not limited thereto. A steering device with a structure in which transmission of power between the steering unit 4 and the turning unit 6 can be cut off by a clutch may be employed.

In the aforementioned embodiment, the steering device 2 to be controlled (i.e., a control target) is a steer-by-wire steering device, but the disclosure is not limited thereto. For example, an electric power steering device to which a motor torque is applied as an assist force may be employed as a control target.

In the aforementioned embodiment, the steering control device 1 is not limited to a steering control device including a CPU and a memory and performing software processes. For example, a dedicated hardware circuit (for example, an ASIC) that performs at least some of the software processes which are performed in the aforementioned embodiment may be provided. That is, the steering control device may have at least one of the following configurations (a) to (c). (a) A processor that performs all the processes in accordance with a program, and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits each of which includes a processor and a program storage device or the number of dedicated hardware circuits may be two or more. That is, the processes may be performed by processing circuitry including at least one of i) one or more software processing circuits and ii) one or more dedicated hardware circuits.

Technical concepts which can be understood from the embodiments and the modified examples will be supplemented below: (1) A steering control device in which the steering device has a structure in which transmission of power between a steering unit and a turning unit that turns turning wheels in accordance with steering input to the steering unit is cut off and the motor is a turning-side motor that applies the motor torque as a turning force which is a force for turning the turning wheels.

What is claimed is:

1. A steering control device configured to control a steering device to which a motor torque is applied from an actuator with a motor as a drive source, the steering control device comprising:
   a control unit configured to output a motor control signal for controlling operation of the motor;
   a drive circuit configured to supply a drive electric power to the motor based on the motor control signal,
   wherein the control unit is configured to:
      calculate a torque command value which is a target value of the motor torque the torque command value is based on execution of angle control for adjusting a convertible angle which is able to be converted to a rotation angle of the motor;
      calculate the motor control signal based on the torque command value; and
      change a control gain which is used for the angle control based on a change of a factor influencing a behavior of a vehicle in response to steering, wherein:
   the motor includes a plurality of coil groups with different power supply paths;
   a plurality of groups each including the control unit and the drive circuit is provided such that the groups respectively correspond to the coil groups, a number of the groups being same as a number of the coil groups;
   a plurality of control systems is provided between the motor and the steering control device, the control systems being configured to individually control torques generated by the coil groups; and
   the factor includes a drive mode of the motor,
   the drive mode includes
      a cooperative mode in which torques generated by the coil groups of the control systems are controlled based on the torque command value calculated by the control unit of one of the control systems,
      an independent mode in which torque generated by each of the coil groups of the control systems is controlled based on the torque command value calculated by the control unit of a corresponding one of the control systems, and
      a residual mode in which, when one of the control systems is abnormal, torque generated by the coil group of a remainder of the control systems is controlled based on the torque command value calculated by the control unit of the remainder of the control systems, the remainder being normal; and the control gain changes such that the control gain increases in order of the independent mode, the cooperative mode, and the residual mode.

2. The steering control device according to claim 1, wherein:
the factor includes a vehicle speed; and
the control gain changes such that the control gain increases with an increase of the vehicle speed.

3. The steering control device according to claim 1, wherein:
the factor includes an acceleration-deceleration state of the vehicle; and
the control gain changes to be smaller when the vehicle is in a deceleration state than when the vehicle is in a non-deceleration state.

4. The steering control device according to claim 1, wherein:
the factor includes a lateral acceleration; and
the control gain changes such that the control gain increases with an increase of an absolute value of the lateral acceleration.

5. The steering control device according to claim 1, wherein:
the factor includes at least one target temperature among a temperature of the motor, a temperature of the control unit, a temperature of the drive circuit, a temperature of the steering device, and an ambient temperature around the steering device; and
the control gain changes such that the control gain increases with a decrease of the target temperature.

6. The steering control device according to claim 1, wherein:
the angle control includes feedback control for causing the convertible angle to conform to a target angle; and
the control gain includes a feedback gain which is used for the feedback control.

7. The steering control device according to claim 1, wherein:
the angle control includes feedforward control based on a target angle; and
the control gain includes a feedforward gain which is used for the feedforward control.

8. The steering control device according to claim 1, wherein:
the angle control includes damping control based on a target angular velocity which is a rate of change of a target angle; and
the control gain includes a damping gain which is used for the damping control.

* * * * *